(12) United States Patent
Orita et al.

(10) Patent No.: US 8,612,053 B2
(45) Date of Patent: Dec. 17, 2013

(54) CONTROL DEVICE FOR MOBILE ROBOT

(75) Inventors: Atsuo Orita, Wako (JP); Masao Kanazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 12/978,905

(22) Filed: Dec. 27, 2010

(65) Prior Publication Data

US 2011/0160906 A1 Jun. 30, 2011

(30) Foreign Application Priority Data

Dec. 28, 2009 (JP) ................................ 2009-297177
Sep. 13, 2010 (JP) ................................ 2010-204855

(51) Int. Cl.
G05B 19/04 (2006.01)
G05B 19/18 (2006.01)
G05B 15/00 (2006.01)

(52) U.S. Cl.
USPC ............ 700/260; 700/245; 700/251; 700/253

(58) Field of Classification Search
USPC ..................... 700/50–66, 186–189, 245–264
See application file for complete search history.

(56) References Cited

U.S. PATENT DOCUMENTS

| 5,355,064 | A * | 10/1994 | Yoshino et al. | 318/568.12 |
|---|---|---|---|---|
| 5,432,417 | A * | 7/1995 | Takenaka et al. | 318/568.12 |
| 6,243,623 | B1 * | 6/2001 | Takenaka et al. | 700/245 |
| 6,289,265 | B1 * | 9/2001 | Takenaka et al. | 700/245 |
| 6,876,903 | B2 * | 4/2005 | Takenaka | 700/245 |
| 6,962,220 | B2 * | 11/2005 | Takenaka et al. | 180/8.6 |
| 7,330,775 | B2 * | 2/2008 | Orita et al. | 700/245 |
| 2004/0044440 | A1 * | 3/2004 | Takenaka | 700/245 |
| 2004/0143369 | A1 * | 7/2004 | Takenaka et al. | 700/245 |
| 2005/0038560 | A1 * | 2/2005 | Nagasaka | 700/245 |
| 2005/0075755 | A1 * | 4/2005 | Takenaka et al. | 700/245 |
| 2005/0113973 | A1 * | 5/2005 | Endo et al. | 700/245 |
| 2005/0154492 | A1 * | 7/2005 | Takenaka et al. | 700/245 |
| 2005/0209534 | A1 * | 9/2005 | Dariush | 600/595 |
| 2005/0209536 | A1 * | 9/2005 | Dariush | 600/595 |
| 2006/0106495 | A1 * | 5/2006 | Takenaka et al. | 700/253 |
| 2006/0293791 | A1 * | 12/2006 | Dariush | 700/245 |
| 2007/0150105 | A1 * | 6/2007 | Orita et al. | 700/245 |
| 2007/0255454 | A1 * | 11/2007 | Dariush | 700/245 |
| 2011/0160907 | A1 * | 6/2011 | Orita | 700/260 |

FOREIGN PATENT DOCUMENTS

| JP | 05-305579 | 11/1993 |
|---|---|---|
| JP | 2007-160446 | 6/2007 |

* cited by examiner

*Primary Examiner* — Khoi Tran
*Assistant Examiner* — Bhavesh V Amin
(74) *Attorney, Agent, or Firm* — Rankin, Hill & Clark LLP

(57) ABSTRACT

A control device for a mobile robot, in which the desired value of a motion state amount of a mobile robot includes at least the desired value of a vertical component of a first-order differential value of the translational momentum of the entire mobile robot. The desired value is determined by a state amount desired value determiner such that the observed value of the vertical position of an overall center-of-gravity point of the mobile robot is converged to a predetermined desired value according to a feedback control law. A control input determiner carries out the processing of inverse dynamics calculation, using the desired value of the motion state amount thereby to determine the desired driving force for each joint. The operation of an actuator is controlled on the basis of the determined desired driving force.

9 Claims, 6 Drawing Sheets

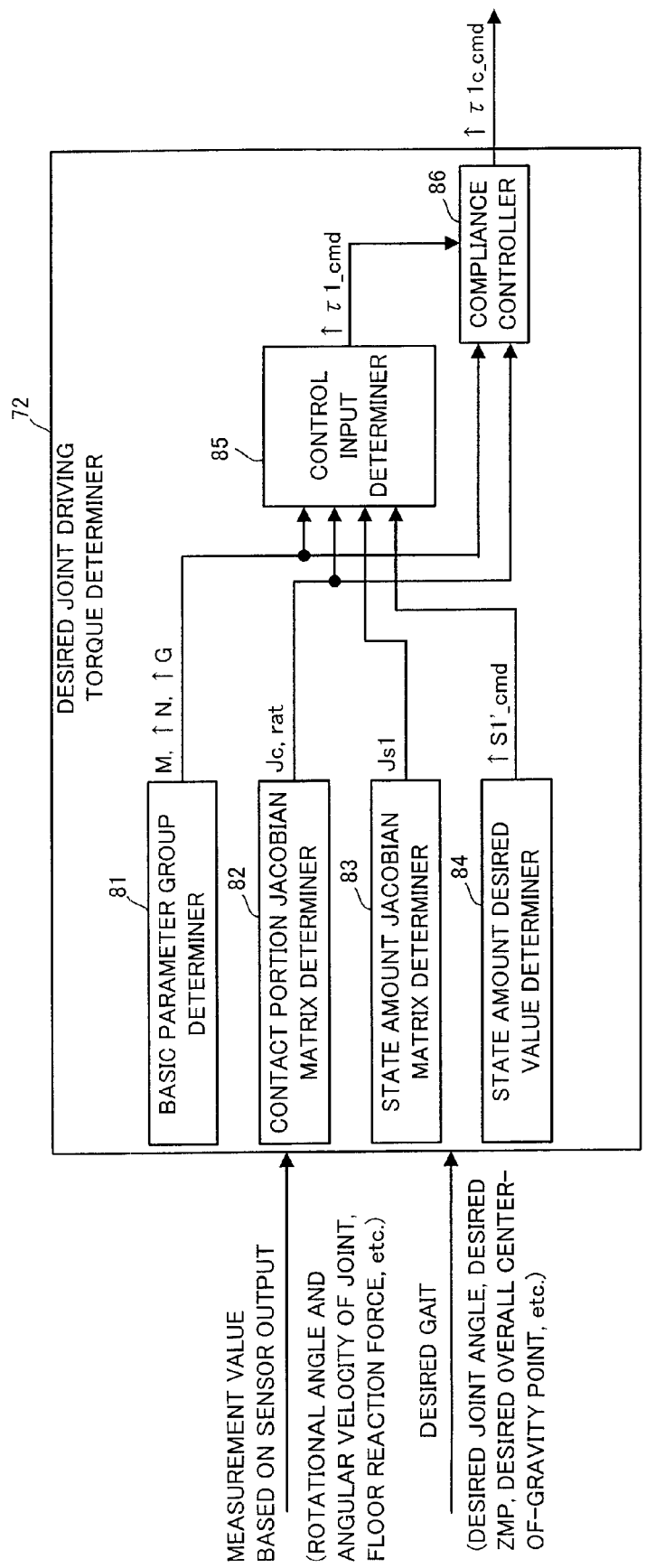

ONE-LEG GROUND
CONTACT STATE
(RIGHT LEG IN CONTACT
WITH GROUND)

TWO-LEG GROUND
CONTACT STATE

ONE-LEG GROUND
CONTACT STATE
(LEFT LEG IN CONTACT
WITH GROUND)

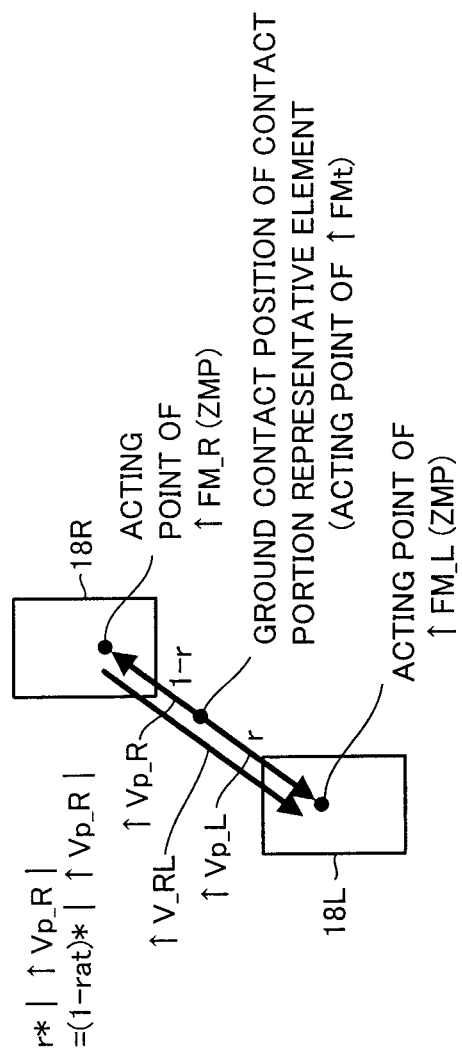

CONTROL DEVICE FOR MOBILE ROBOT

BACKGROUND OF THE INVENTION

1. Field of the Invention

The present invention relates to a control device for a mobile robot, such as a legged mobile robot.

2. Description of the Related Art

As a technique for controlling a legged mobile robot, such as a bipedal walking robot, there has been generally known so-called position control proposed in, for example, Japanese Patent Application Laid-Open No. 5-305579 by the applicant of the present application. According to the disclosed technique, the desired displacement amount of each joint of a robot is sequentially determined on the basis of a desired motion of the robot (e.g., the trajectory of a desired position of the distal end of a leg of the robot), and then the actuator of each joint is drivably controlled so as to cause an actual displacement amount to coincide with the desired displacement amount.

According to the position control described above, the actual displacement amount of a joint is maintained to be constant as long as the desired displacement amount of the joint remains constant, thus inconveniently presenting poor flexibility in response to a change in an external force acting on the robot.

As a solution to the inconvenient inflexibility, there has been known a technique disclosed in, for example, Japanese Patent Application Laid-Open No. 2007-160446. According to the technique, a spring member is interposed between a joint and an actuator to impart flexibility to the joint, and a desired driving force for each joint to accomplish a desired motion of a robot is determined by inverse dynamics calculation so as to control the actual driving force of each joint to the desired driving force thereof by so-called force control.

In a mobile robot, such as a bipedal walking robot, if a spring member is provided between a joint and an actuator, as with the technique disclosed in the aforesaid Japanese Patent Application Laid-Open No. 2007-160446, the displacement amount of each joint of the robot tends to change in response to, for example, a change in an external force acting on the robot. This easily causes the overall center-of-gravity point of the robot to fluctuate.

Especially when the position of the overall center-of-gravity point of the robot changes in a vertical direction, the overall center-of-gravity point frequently vibrates in the vertical direction accordingly, possibly leading to a resonant vibration. Such a vibration may make it difficult to stably accomplish a desired motion of the robot.

SUMMARY OF THE INVENTION

The present invention has been made in view of the background described above, and it is an object of the invention to provide a control device enabling a mobile robot, which has a spring member installed in a power transmitting system located between a joint and an actuator which drives the joint, to stably accomplish a desired motion while restraining the mobile robot from tottering.

To this end, the control device for a mobile robot in accordance with the present invention is a control device for a mobile robot which has a plurality of links interconnected through joints and actuators for driving the individual joints and in which a power transmitting system located between each joint and each actuator is provided with a spring member which converts the power generated by the actuator into an elastic force and imparts the elastic force to the joint, the control device including:

a motion state amount desired value determining unit which determines a motion state amount desired value, which is a desired value related to a predetermined type of motion state amount of the mobile robot which has a value dependent on the value of a generalized variable vector of the mobile robot, the vector being constituted of the displacement amount of each joint of the mobile robot and the position and the posture of a predetermined representative link of the mobile robot on a global coordinate system as the components thereof;

a desired driving force determining unit which receives the determined motion state amount desired value and determines a desired driving force to be imparted to each joint of the mobile robot by carrying out processing of inverse dynamics calculation, using at least the motion state amount desired value; and an actuator control unit which controls the operation of the actuator on the basis of at least the determined desired driving force, wherein the motion state amount desired value includes at least a desired value of a vertical component of a first-order differential value of a total translational momentum of the mobile robot, and the motion state amount desired value determining unit has a unit which determines the desired value of the vertical component of the first-order differential value of the translational momentum such that the observed value of the vertical position of an overall center-of-gravity point of the mobile robot is converged to a predetermined desired value according to a feedback control law (a first aspect of the invention).

Supplementarily, according to the present invention, the term "position" of the representative link means a spatial position of a representative point fixed relative to the link, and the term "posture" of the representative link means a spatial orientation of the link. The representative link may by any link among the links of a mobile robot.

According to the first aspect of the invention, the desired driving force determiner determines a desired driving force to be imparted to each joint of the mobile robot by carrying out the processing of the inverse dynamics calculation (the inverse dynamics calculation here refers to the calculation for generating a driving force that can be imparted to each joint of the robot from a state amount to be controlled (the desired value of a motion state amount) and an external force acting on the robot) by using the desired value of a motion state amount determined by the motion state amount desired value determiner. With this arrangement, a desired driving force that allows the desired value of a motion state amount to be achieved is determined. Further, the operation of the actuator is controlled by the actuator controller on the basis of at least the desired driving force.

In this case, according to the first aspect of the invention, the desired value of the motion state amount determined by the motion state amount desired value determiner includes the desired value of the vertical component of the first-order differential value (temporal change rate) of the overall translational momentum of the mobile robot. The desired value of the vertical component of the first-order differential value of the translational momentum, and by extension, the desired value of the vertical component of an inertial force (translational inertial force) generated by a translational motion of the overall center-of-gravity point of the mobile robot, are determined such that the observed value of the position in the vertical direction of the overall center-of-gravity point of the mobile robot is converged to a predetermined desired value according to a feedback control law. Further, the desired driving force to be imparted to each joint of the mobile robot is determined such that the desired value of the vertical component of the translational inertial force is attained.

The observed value of the position in the vertical direction of the overall center-of-gravity point of the mobile robot can be estimated from, for example, the measurement value of the displacement amount of each joint of the mobile robot by using a geometric model of the mobile robot.

Thus, according to the first aspect of the invention, the desired driving force to be imparted to each joint can be controlled while restraining the vertical position of an actual overall center-of-gravity point of the mobile robot from deviating from a predetermined desired value. In this case, the desired value of the vertical position of the overall center-of-gravity point of the mobile robot may be set to a value suited to a desired motion of the mobile robot.

As a result, the first aspect of the invention makes it possible to stably implement a desired motion of the mobile robot while restraining the mobile robot from tottering.

In the first aspect of the invention, preferably, the motion state amount desired value further includes a desired value of a horizontal component of the first-order differential value of a total translational momentum of the mobile robot, and the motion state amount desired value determining unit further includes a unit which determines the desired value of the horizontal component of the first-order differential value of the translational momentum such that the observed value of the horizontal position of the overall center-of-gravity point of the mobile robot converges to a predetermined desired value according to a feedback control law (a second aspect of the invention).

According to the second aspect of the invention, the desired value of the horizontal component of the first-order differential value of the overall translational momentum of the mobile robot which has been determined such that the observed value of the horizontal position of the overall center-of-gravity point of the mobile robot converges to a predetermined desired value according to the feedback control law is included in the desired value of a motional state amount.

Consequently, therefore, the desired value of the vertical component of the inertial force (translational inertial force) generated by a translational motion of the overall center-of-gravity point of the mobile robot is determined such that the observed value of the vertical position of the overall center-of-gravity point of the mobile robot converges to a predetermined desired value, and also the desired value of the horizontal component of the translational inertial force is determined such that the observed value of the horizontal position of the overall center-of-gravity point of the mobile robot converges to a predetermined desired value. Further, the desired driving force to be imparted to each joint of the mobile robot is determined such that the desired value of the vertical component of the translational inertial force and the desired value of the horizontal component thereof are attained.

The observed value of the horizontal position of the overall center-of-gravity point of the mobile robot can be estimated from, for example, the measurement value of the displacement amount of each joint of the mobile robot, by using a geometric model of the mobile robot, as with the observed value of the vertical position.

Thus, according to the second aspect of the invention, the desired driving force to be imparted to each joint can be controlled while restraining the vertical position and the horizontal position, i.e., the spatial positions, of the actual overall center-of-gravity point of the mobile robot from deviating from predetermined desired values. In this case, the desired values of the vertical position and the horizontal position of the overall center-of-gravity point of the mobile robot may be set to values suited to a desired motion of the mobile robot.

As a result, the second aspect of the invention makes it possible to stably implement a desired motion of the mobile robot while further effectively restraining the mobile robot from tottering.

In the first aspect or the second aspect of the invention, preferably, the desired value of the motional state amount further includes a desired value of the first-order differential value of an angular momentum about a predetermined reference point of the entire mobile robot, and the motion state amount desired value determining unit further has a unit which determines the desired value of the first-order differential value of the angular momentum such that the observed value of the horizontal position of the overall center-of-gravity point of the mobile robot converges to a predetermined desired value according to a feedback control law (a third aspect of the invention).

According to the third aspect of the invention, the desired value of the first-order differential value of the overall angular momentum (the angular momentum about a predetermined reference point) of the mobile robot, and by extension, the desired value of a moment of an inertial force generated by a motion of the entire mobile robot (a moment about a predetermined reference point; hereinafter referred to the moment inertial force in some cases) are determined such that the observed value of the horizontal position of the overall center-of-gravity point of the mobile robot converges to predetermined desired values according to a feedback control law. Further, the desired driving force to be imparted to each joint of the mobile robot is determined such that the desired value of the translational inertial force and also the desired value of the moment inertia force are attained.

Thus, the third aspect of the invention makes it possible to control a desired driving force to be imparted to each joint while restraining, by a moment inertia force, the horizontal position of the actual overall center-of-gravity point of the mobile robot from deviating from a predetermined desired value. In this case, if, for example, a virtual inverted pendulum having the overall center-of-gravity point as the mass point thereof is assumed, then the desired value of the horizontal position of the overall center-of-gravity point related to the moment inertial force may be set to a position in the vertical direction above the supporting point of the inverted pendulum (e.g., a desired ZMP). The desired value of the horizontal position of the overall center-of-gravity point related to the moment inertial force does not have to be the same as the desired value of the horizontal position of the overall center-of-gravity point related to the horizontal component of a translational inertial force.

According to the third aspect of the invention, therefore, a desired motion of the mobile robot can be stably implemented while further effectively restraining the mobile robot from tottering.

In the first to the third aspects of the invention, more specifically, the desired driving force is preferably determined, for example, as described below.

The control device for a mobile robot further includes:

a basic parameter group calculating unit which calculates a basic parameter group constituted of an inertia matrix for converting the second-order differential value of a generalized variable vector into a generalized force vector and a gravity-dependent generalized force vector value, which is the value of a generalized force vector produced by a gravitational force acting on each link of the mobile robot, or a basic parameter group constituted of the inertia matrix, the gravity-dependent generalized force vector, and a centrifugal force/Coriolis force-dependent generalized force vector value, which is the value of a generalized force vector generated by a centrifugal force and a Coriolis force acting on each link of the mobile robot, on the basis of generalized variable observation information, which includes at least the observed value of an actual displacement amount of each joint of the mobile robot;

a contact portion Jacobian matrix calculating unit which receives contact state information indicating the contact state or states of one or more contact portions coming in contact with an external world while the mobile robot is traveling and the generalized variable observation information and calculates a contact portion Jacobian matrix, which is a Jacobian matrix expressing a relationship between the motion velocity of a predetermined contact portion representative element set as an element representing the motion of the one or more contact portions being in contact with the external world and a first-order differential value of the generalized variable vector on the basis of at least the received contact state information and generalized variable observation information; and a state amount Jacobian matrix calculating unit which receives the generalized variable observation information and calculates a state amount Jacobian matrix, which is a Jacobian matrix expressing a relationship between the motion state amount and the first-order differential value of the generalized variable vector on the basis of at least the received generalized variable observation information.

Further, the desired driving force determining unit receives the basic parameter group, the contact portion Jacobian matrix and the state amount Jacobian matrix, which have been calculated, the desired value of a contact portion representative element motion acceleration, which is the desired value of the motion acceleration of the contact portion representative element, the generalized variable observation information, and the determined motion state amount desired value, uses the received data to calculate a component value corresponding to the displacement amount of each joint in a desired generalized force vector τcmd, which is a target of a generalized force vector that satisfies the relationship of expression 01 given below, and determines the calculated component value as a desired driving force to be imparted to the joint (a fourth aspect of the invention).

$$S'+(J_s*M^{-1}*T_c-J_s')*q'=(J_s*M^{-1}*P_c)*(\tau_{cmd}-\tau_{cmpn}) \quad \text{Expression 01}$$

where q: generalized variable vector q': observed value of first-order differential value of q (=dq/dt)

S: state amount

S': desired value of first-order differential value of S (=dS/dt)

M: inertia matrix

τcmpn: vector defined by τcmpn≡(N+G)−Pc$^{-1}$*Cc or τcmpn≡G−Pc$^{-1}$*Cc

G: gravity-dependent generalized force vector value

N: centrifugal force/Coriolis force-dependent generalized force vector value

Pc: matrix defined by Pc≡I−Jc$^T$*(Jc#)$^T$

I: unit matrix

Jc: contact portion Jacobian matrix

Jc#: matrix defined by Jc#≡(M$^{-1}$)$^T$*Jc$^T$*Rc$^T$

Rc: matrix defined by Rc≡((Jc*M$^{-1}$*Jc$^T$)$^{-1}$)$^T$

Cc: vector defined by Cc≡−Jc$^T$*Rc*C

C: desired value of contact portion representative element motion acceleration (scalar or vector)

Tc: matrix defined by Tc≡−Jc$^T$*Rc*Jc'

Jc': matrix obtained by subjecting Jc to first-order differentiation (=dJc/dt)

Js: state amount Jacobian matrix

Js': matrix obtained by subjecting Js to first-order differentiation (=dJs/dt)

In the present description, "*" denotes multiplication.

Supplementarily, in the fourth aspect of the invention, the aforesaid generalized variable vector is a vector having the components thereof corresponding to the components of a generalized variable vector (a vector constituted of the same number of components as that of the generalized variable vector). To be more specific, the aforesaid generalized force vector is a vector whose components provide a force (a translational force or a moment) that causes temporal changes in the corresponding component values of the generalized variable vector.

The aforesaid generalized variable observation information means the information having, as its constituent element, an observed value (specifically, an actual instantaneous value of the component or the observed value of the temporal change rate thereof (first-order differential value)) related to an actual value of the generalized variable vector component (including the displacement amount of a joint). In this case, the observed value may be of course a value directly detected by a sensor. Alternatively, the observed value may be an estimated value that is estimated according to an appropriate model or a natural law from the detection value or values of one or more other physical quantities having correlativity with the observed value.

According to the fourth aspect of the invention, the aforesaid basic parameter group (the inertia matrix M, the gravity-dependent generalized force vector value G and the centrifugal force/Coriolis force-dependent generalized force vector value N, or M and G), the aforesaid contact portion Jacobian matrix Jc, and the aforesaid state amount Jacobian matrix Js are calculated by the basic parameter group calculating unit, the contact portion Jacobian matrix calculating unit, and the state amount Jacobian matrix calculating unit, respectively, as the parameters necessary to calculate the desired generalized force vector τcmd according to the aforesaid expression 01.

To supplementarily describe the basic parameter group, the total sum of the centrifugal force/Coriolis force-dependent generalized force vector value N and the gravity-dependent generalized force vector value G (=N+G) becomes nearly G (N+G≈G) in some cases. In such a case, only M and G may be calculated as the basic parameter group.

Further, the aforesaid contact portion representative element related to the contact portion Jacobian matrix Jc means an element that represents the motion of the aforesaid one or more contact portions of the robot that will be subjected to restrictions upon contact with an external world (the aforesaid one or more contact portions whose motion or motions (e.g., the positions or posture angles, or the temporal change rates thereof) are restricted according to the motion thereof). Incidentally, the term "posture angle" means a spatial orientation expressed using an angle as the unit thereof. The contact portion representative element may be an actual contact portion or a particular portion or a point included therein. Alternatively, the contact portion representative element may be a virtual element whose positional relationship or posture relationship with a contact portion is a predetermined relationship.

Further, the aforesaid contact state information is the information that indicates the state of the contact between the aforesaid one or more contact portions and an external world (e.g., the information on which contact portion is in contact with an external world or the state of an external force applied due to the contact of each contact portion with an external world).

Further, the desired driving force determining unit uses, as input data, the basic parameter group (M, G and N or M and G), the contact portion Jacobin Jc and the state amount Jacobian matrix Js, the contact portion representative element motion acceleration desired value C, the generalized variable observation information (specifically, q' recognized from the generalized variable observation information), and a desired value S' of the first-order differential value of the predetermined type of state amount so as to calculate the component value corresponding to the displacement amount of each joint in a desired generalized force vector τcmd, which is the target of a generalized force vector that satisfies the relationship of the aforesaid expression 01, and determines the calculated component value as the desired driving force to be imparted to the joint.

Thus, according to the fourth aspect of the invention, the desired driving force to be imparted to each joint is determined by using the desired value of the contact portion representative element motion acceleration and the desired value of the motion state amount desired value as the targets restricting the motion of the robot.

Here, the motion of the contact portion is the motion of a part of the robot, so that the motion of each joint of the robot for achieving the desired value of the contact portion representative element motion acceleration is provided with redundancy. In other words, the degree of freedom of the motion acceleration of the contact portion representative element is smaller than the degree of freedom of the entire robot (the degree of freedom of the generalized variable vector).

Further, the motion state amount desired value means the desired value of the first-order differential value of the overall translational momentum of the mobile robot or the desired value of the first-order differential value of an angular momentum, so that the motion of each joint of the robot for achieving the motion state amount desired value is also provided with redundancy. In other words, the degree of freedom of the motion state amount is smaller than the degree of freedom of the entire robot (the degree of freedom of a generalized variable vector).

Hence, the arbitrariness of the motion of a joint of the robot is enhanced by determining a desired driving force to be imparted to each joint according to the aforesaid expression 01, using the desired value of the contact portion representative element motion acceleration and the motion state amount desired value as the targets restricting the motion of the robot.

In addition, defining the motion of the contact portion representative element by using the desired value of the contact portion representative element motion acceleration makes it possible to determine the desired driving force of each joint that allows the motion state amount desired value to be achieved according to the aforesaid expression 01 without identifying an external force acting on the robot at the aforesaid contact portion (the external force mutually influencing the driving force to be imparted to each joint of the robot).

Thus, in addition to the advantages provided by the first to the third aspects of the invention, the fourth aspect of the invention makes it possible to control the driving force to be imparted to each joint to a driving force that is appropriate for causing a robot to accomplish a desired motion while at the same time enhancing the flexibility of the motion of each joint of the robot.

Supplementarily, in the fourth aspect of the invention, if the matrix of the right side (Js*M$^{-1}$*Pc) of the aforesaid expression 01 (hereinafter referred to as the matrix As in some cases) is a regular matrix, then the aforesaid desired generalized force vector τmcd may be calculated by carrying out the calculation of the right side of expression 5-22, which will be discussed later, by using a matrix Bs (i.e., the inverse matrix of As) determined according to expression 5-21a, which will be discussed later. If the matrix As is not a regular matrix, then the aforesaid desired generalized force vector τmcd can be calculated by carrying out the calculation of the right side of expression 5-22, which will be discussed later, by using, for example, the matrix Bs determined according to expression 5-21b, which will be discussed later.

In the fourth aspect of the invention, if the degree of freedom of the motion of the contact portion representative element is larger than the actual degree of freedom restricted by contact, then the motion of a joint of the robot tends to be easily subjected to the restrictions based on the desired value of the contact portion representative element motion acceleration. For this reason, to enhance the arbitrariness of the motion of a joint of the robot, the excess of the degree of freedom of the motion of the contact portion representative element over the actual degree of freedom is preferably minimized. Further preferably, the motion of the contact portion representative element does not develop a discontinuous change.

Considering the requirements described above, if, for example, the robot is a bipedal mobile robot that travels on a floor surface by carrying out a motion in which the distal portions of two leg links alternately come in contact with the floor surface (i.e., a robot in which the distal portions of two leg links function as the portions contacting with an external world), then the following construction is ideally adopted.

The contact portion representative element is an element, the position and posture of which exhibit springy displacements based on a total floor reaction force, which is the resultant force of floor reaction forces acting on the two leg links, and also an element in which the springy displacement amounts of the position and posture of the contact portion representative element are such that the springy displacement amounts of the position and posture of the distal portion of a first leg link caused by a floor reaction force acting on the first leg link out of the two leg links and the springy displacement amounts of the position and posture of the distal portion of a second leg link caused by a floor reaction force acting on the second leg link out of the two leg links have a relationship indicated by expression 02 given below, and the contact portion Jacobian matrix calculating unit calculates the contact portion Jacobian matrix Jc by calculating the right side of expression 03 given below (a fifth aspect of the invention).

$$Xcc = r\_at * A1 * X1 + (1 - r\_at) * A2 * X2 \quad \text{Expression 02}$$

$$Jc = r\_at * A1 * J1 + (1 - r\_at) * A2 * J2 \quad \text{Expression 03}$$

where

Xcc: vector, the components of which are the springy displacement amounts of the position and posture of a contact portion representative element r_at: coefficient set according to contact state information such that r_at=0 in a state wherein only the first leg link is in contact with the ground, r_at=1 in a state wherein only the second leg link is in contact with the ground, or r_at continuously changes in a range defined by $0 \leq r\_at \leq 1$ in a state wherein both the first leg link and the second leg link are in contact with the ground X1: vector, the components of which are the amounts of the springy displacements of the position and posture of the distal portion of the first leg link produced according to a floor reaction force acting on the first leg link X2: vector, the components of which are the amounts of the springy displacements of the position and posture of the distal portion of the second leg link produced according to a floor reaction force acting on the second leg link A1: matrix for converting a first floor reaction force vector constituted of a translational force component and a moment component of a floor reaction force acting on the first leg link into a floor reaction force vector acting on the contact portion representative element A2: matrix for converting a second floor reaction force vector constituted of a translational force component and a moment component of a floor reaction force acting on the second leg link into a floor reaction force vector acting on the contact portion representative element J1: Jacobian matrix expressing the relationship between a first-order differential value X1' of X1 (=dX1/dt) and a first-order differential value q' of a generalized variable vector q by X1'=J1*q'

J2: Jacobian matrix expressing the relationship between a first-order differential value X2' of X2 (=dX2/dt) and a first-order differential value q' of a generalized variable vector q by X2'=J2*q'

According to the fifth aspect of the invention, the contact portion representative element is defined as an element, the position and the posture of which develop springy displacements based on a total floor reaction force, which is the resultant force of the floor reaction forces acting on the two individual leg links, and also as an element in which the springy displacement amounts of the position and posture of the contact portion representative element are such that the springy displacement amounts of the position and posture of the distal portion of a first leg link caused by a floor reaction force acting on the first leg, link out of the two leg links and the springy displacement amounts of the position and posture of the distal portion of a second leg link caused by a floor reaction force acting on the second leg link out of the two leg links have a relationship indicated by the aforesaid expression 02.

According to the contact portion representative element defined as described above, either in the state wherein the distal portion of only one of the two leg links of the robot is in contact with the ground (or a floor) or in the state wherein the distal portions of both leg links are in contact with the ground, the degree of freedom of the motion thereof is only a total of six degrees of freedom composed of three degrees of freedom of a translational motion and three degrees of freedom of a rotational motion. This means that the degree of freedom of a motion of a contact portion representative element is the same degree of freedom as that of the distal portion of a single leg link.

Thus, if the motion of a contact portion representative element is restricted by the desired value of the contact portion representative element motion acceleration, then the resulting restricted degree of freedom of the mobile robot will be only six degrees of freedom. This makes it possible to further enhance the arbitrariness of the motion of the mobile robot, while minimizing the excess of the freedom degree of the motion of the contact portion representative element over an actual degree of freedom.

Moreover, making the coefficient r at continuously change in the range of $0 \leq r$ at $\leq 1$ allows the continuity of the motion of the contact portion representative element to be achieved. This in turn makes it possible to enhance the stability of the motion of the mobile robot while restraining a desired driving force for each joint of the mobile robot from discontinuously changing.

Further, in the fifth aspect of the invention, the contact portion Jacobian matrix Jc related to the contact portion representative element defined as described above is calculated according to the aforesaid expression 03. In this case, the matrixes A1 and A2 and the Jacobian matrixes J1 and J2 need to be calculated. The matrixes A1 and A2 depend upon the contact state of a leg link (i.e., the state of contact with a floor), so that the matrixes A1 and A2 can be determined on the basis of, for example, the aforesaid contact state information.

The first-order differential value X1' of X1 (=dX1/dt) may be considered to agree with the motion velocity (the translational velocity and the rotational velocity) of the distal portion of the first leg link, and the first-order differential value X2' of X2 (=dX2/dt) may be considered to agree with the motion velocity (the translational velocity and the rotational velocity) of the distal portion of the second leg link. Hence, the Jacobian matrixes J1 and J2 of expression 03 can be calculated on the basis of the aforesaid generalized variable observation information.

Thus, the contact portion Jacobian matrix can be calculated by calculating the right side of the aforesaid expression 03.

In the fourth aspect or the fifth aspect of the invention, preferably, the actuator control unit includes a contact portion external force desired value determining unit which determines a contact portion external force desired value as an estimated value of an external force acting on the contact portion by carrying out processing of inverse dynamics calculation, using the desired driving force and the contact portion motion acceleration desired value, which have been determined, in the case where it is assumed that a driving force to be actually imparted to each joint of the mobile robot coincides with the determined desired driving force and the actual motion acceleration of the contact portion representative element coincides with the desired value of the contact portion representative element motion acceleration, and a driving force correction amount calculating unit which determines a correction amount of the desired driving force according to a feedback control law such that a difference between the contact portion external force desired value and an observed value of an external force actually acting on the contact portion is converged to zero, wherein the operation of the actuator is controlled on the basis of the desired driving force that has been corrected using the correction amount (a sixth aspect of the invention).

According to the sixth aspect of the invention, the estimated value of an external force acting on the contact portion in the case, where it is assumed that the driving force actually imparted to each joint of the mobile robot is made to coincide with the determined desired driving force and the actual motion acceleration of the contact portion representative element is made to coincide with the desired value of the contact portion representative element motion acceleration, is determined as the contact portion external force desired value. Further, the desired driving force is corrected on the basis of a correction amount determined according to a feedback control law such that the difference between the contact portion external force desired value and the observation value of an external force actually acting on the contact portion is converged to zero. Then, the operation of the actuator is controlled on the basis of the corrected desired driving force.

Thus, the sixth aspect of the invention makes it possible to compensate for an influence of an error or the like of a model on which the aforesaid expression 01 is based, thereby preventing a mismatch between a contact portion external force desired value corresponding to a desired driving force determined according to the aforesaid expression 01 and an external force actually acting on the contact portion. This permits enhanced stability of the motion of the robot.

BRIEF DESCRIPTION OF THE DRAWINGS

FIG. 4 is a block diagram illustrating the functions of a desired joint driving torque determiner shown in FIG. 3;

FIG. 6 is a diagram for describing the processing in a second embodiment of the contact portion Jacobian matrix determiner shown in FIG. 4.

DESCRIPTION OF THE PREFERRED EMBODIMENTS

First Embodiment

The following will describe a first embodiment of the present invention with reference to FIG. 1 to FIG. 5.

Figure 1:
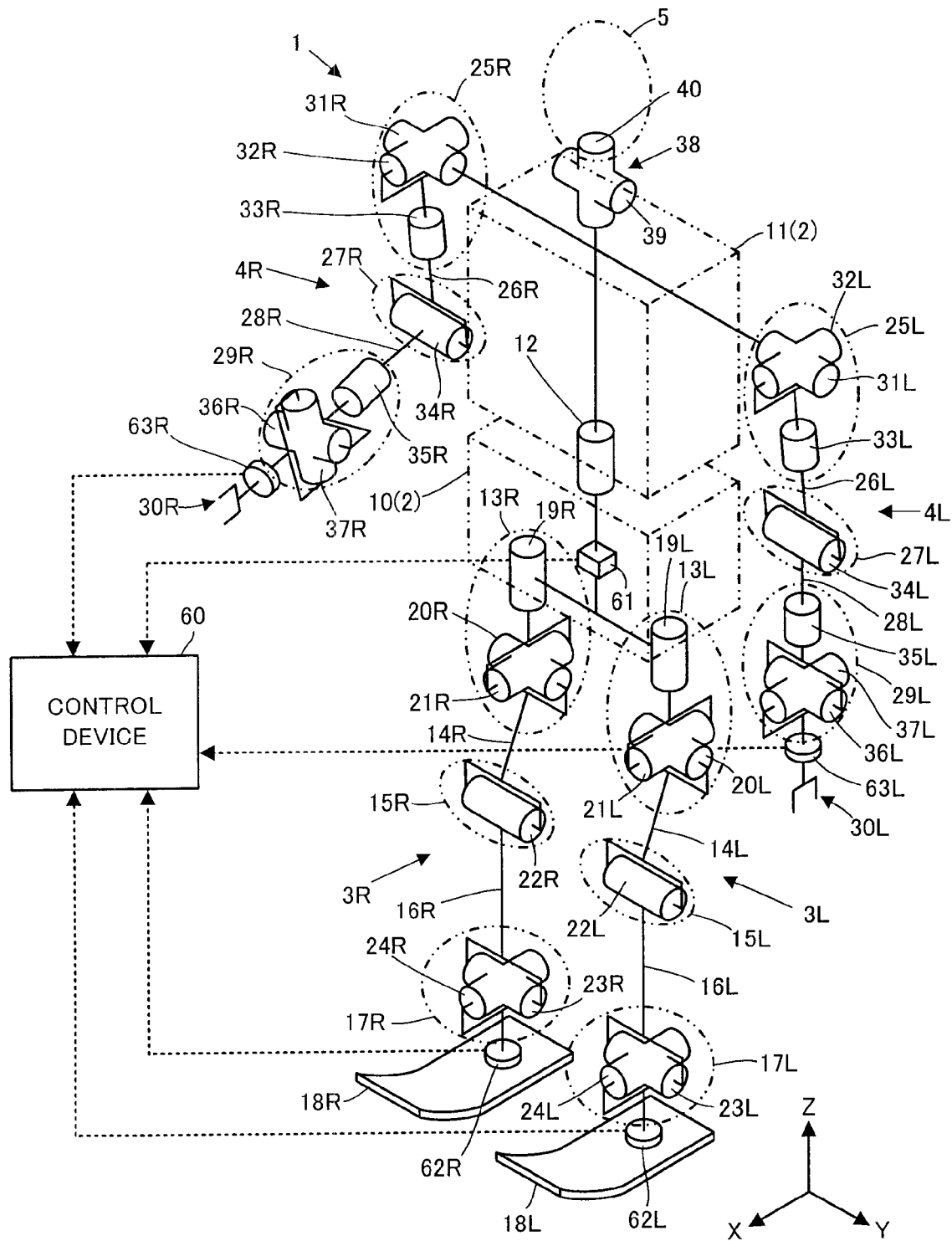
FIG. 1 is a schematic diagram illustrating a skeleton framework of a mobile robot to which an embodiment of the present invention is applied.

FIG. 1 schematically illustrates the skeleton framework of a mobile robot illustrated in the present embodiment. This mobile robot 1 (hereinafter referred to simply as the robot 1) is a bipedal mobile robot as a legged mobile robot. The robot 1 is roughly constituted of a body link 2, a pair of right and left leg links 3R, 3L, a pair of right and left arm links 4R, 4L, and a head 5.

In the present description, a member on the right side observed facing to the front of the robot 1 or a variable indicating a quantity associated with the member will be suffixed by a character "R," while a member on the left side observed facing to the front of the robot 1 or a variable indicating a quantity associated with the member will be suffixed by a character "L." However, the characters "R" and "L" may be omitted unless it is particularly necessary to distinguish between the right side and the left side.

The body link 2 is constituted of a lower body 10, which provides the base body of the robot 1, and an upper body 11, which is disposed above the lower body 10. The upper body 11 is connected to the lower body 10 through a body rotating joint 12, which has a freedom degree of rotation about a yaw-axis (about a Z-axis).

The pair of right and left leg links 3R and 3L share the same construction. To be more specific, each leg link 3 is provided with a thigh 14 connected to the lower body 10 through a hip joint 13, a crus 16 connected to the thigh 14 through a knee joint 15, and a foot 18 connected to the crus 16 through an ankle joint 17 as a plurality of links constituting the leg link 3.

In this case, the hip joint 13 is constructed of three joints 19, 20, and 21, which have the freedom degrees of rotation about the yaw-axis, about a pitch-axis (about a Y-axis), and about a roll-axis (an X-axis), respectively. The knee joint 15 is constructed of a joint 22 having a freedom degree of rotation about the pitch-axis. The ankle joint 17 is constructed of two joints 23 and 24 having the freedom degrees of rotation about the pitch-axis and the roll-axis, respectively. Thus, each of the leg links 3 in the present embodiment has a motion freedom of a six-degree-of-freedom relative to the lower body 10. Incidentally, the rotational axes (the roll-axis, the pitch-axis, and the yaw-axis) of the joints 19 to 24 of each of the leg links 3 in the above description indicate the rotational axes in a state wherein the leg link 3 is stretched in the vertical direction.

The pair of right and left arm links 4R and 4L share the same construction. To be more specific, each of the arm links 4 is provided with an upper arm 26 connected to the upper body 11 through a shoulder joint 25, a forearm 28 connected to the upper arm 26 through an elbow joint 27, and a hand 30 connected to the forearm 28 through a wrist joint 29 as a plurality of links constituting the arm link 4.

In this case, the shoulder joint 25 is constructed of three joints 31, 32, and 33 having the freedom degrees of rotation about the pitch-axis, about the roll-axis, and about the yaw-axis, respectively. The elbow joint 27 is constructed of a joint 34 having a freedom degree of rotation about the pitch-axis. The wrist joint 29 is constructed of three joints 35, 36, and 37 having the freedom degrees of rotation about the yaw-axis, about the pitch-axis, and about the roll-axis, respectively. Thus, each of the arm links 4 in the present embodiment has a motion freedom of a seven-degree-of-freedom relative to the upper body 11. Incidentally, the rotational axes (the roll-axis, the pitch-axis, and the yaw-axis) of the joints 31 to 37 of each of the arm links 4 in the above description indicate the rotational axes in a state wherein the arm links 4 are stretched in the vertical direction.

The head 5 is disposed above the upper body 11 and connected to the upper body 11 through a neck joint 38. In this case, the neck joint 38 is composed of two joints 39 and 40 having the freedom degree of rotation about the pitch-axis and about the yaw-axis, respectively. Hence, the head 5 has a motion freedom of a two-degree-of-freedom relative to the upper body 11. Incidentally, the rotational axes (the pitch-axis and the yaw-axis) of the joints 39 and 40 indicate the rotational axes in a state wherein the neck joint 38 is stretched in the vertical direction.

The robot 1 constructed as described above implements spatial motions of the leg links 3 by driving the six joints 19 to 24 of each of the leg links 3, thus enabling the robot 1 to travel on a floor. For example, moving the leg links 3R and 3L in modes (gaits) similar to human walking or running motions enables the robot 1 to walk or run. In this case, each of the links of the robot 1 has six-degree-of-freedom for the spatial position and posture (spatial orientation) thereof.

Further, the seven joints 31 to 37 of each of the arm links 4 are driven to cause each of the arm links 4 to perform spatial motions, enabling a hand 30 of each of the arm links 4 to carry out work, such as touching an appropriate object.

In the present embodiment, since the lower body 10 and the upper body 11, which constitute the body link 2, are connected through the joint 12, the body link 2 can be twisted by driving the joint 12.

Further, the head 5 can be tilted (a rotational motion about the pitch-axis) or panned (a rotational motion about the yaw-axis) by driving the joints 39 and 40 of the neck joint 38.

Supplementarily, the robot 1 in the present embodiment is a humanoid robot having the arm links 4R, 4L and the head 5. Alternatively, however, the robot 1 may be a robot without the arm links 4R, 4L or the head 5. Further alternatively, the joint 12 of the body link 2 may be omitted, thus combining the lower body 10 and the upper body 11 into one body.

Although not specifically illustrated in FIG. 1, the robot 1 has a joint drive system (a mechanism for driving the joints), including electric motors serving as actuators that output motive power for rotatively driving the aforesaid joints.

According to the present embodiment, in order to impart flexibility to each joint, a motive power transmitting system between each joint and an electric motor is provided with a spring member that converts the motive power of the electric motor into elastic force and imparts the elastic force to a driven member of the joint as described below.

Figure 2:
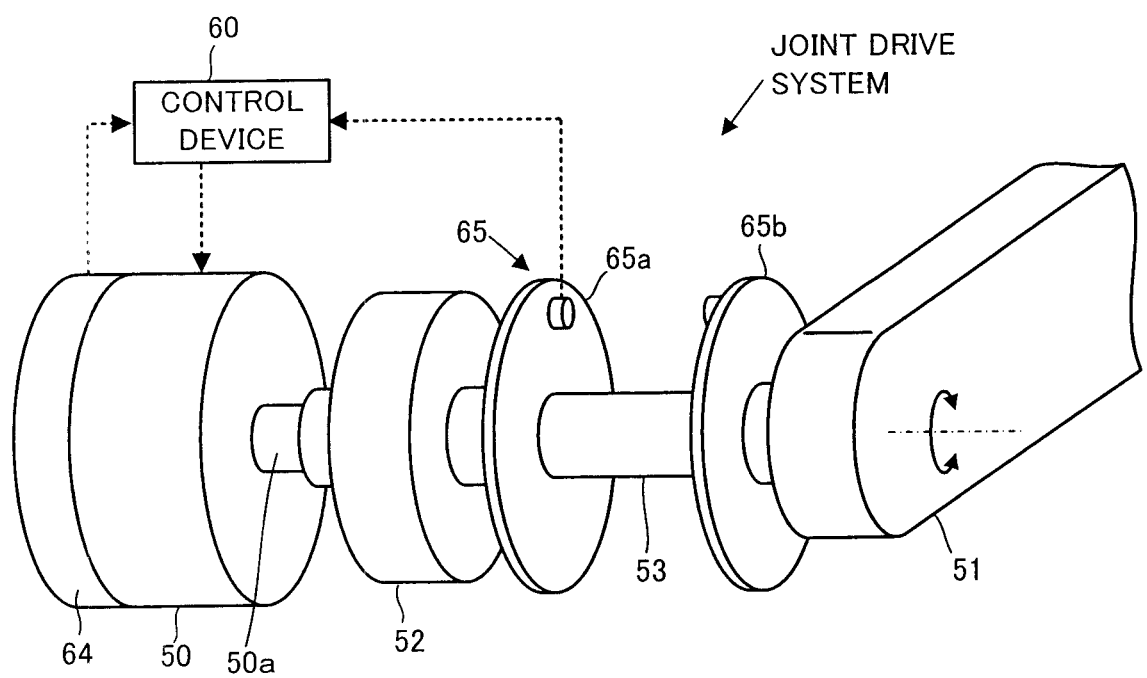
FIG. 2 is a schematic diagram illustrating a skeleton framework of a joint drive system provided in the mobile robot shown in FIG. 1.

FIG. 2 schematically illustrates the skeleton framework of the joint drive system of each joint. The joint drive system includes a reduction gear unit 52, which is constructed of a harmonic drive gear or the like, and a torsion bar 53, which is a spring member, as the motive power transmitting element between an electric motor 50 and a driven member 51 of the joint (hereinafter referred to as the joint driven member 51). An output shaft 50a of the electric motor 50 is connected to the joint driven member 51 through the intermediary of the reduction gear unit 52 and the torsion bar 53 in this order. Thus, the joint drive system is constructed such that the motive power (torque) output by the electric motor 50 is transmitted to the joint driven member 51 via the reduction gear unit 52 and the torsion bar 53 in order. In this case, the motive power (torque) output by the electric motor 50 is converted into an elastic force (torsional force) by the torsion bar 53, and the elastic force is imparted as a drive torque to the joint driven member 51.

Supplementarily, the torsion bar 53 (spring member) here generically represents an elastic member added between the reduction gear unit 52 and the joint driven member 51 or an elastic member originally placed in the motive power transmitting system between the electric motor 50 and the joint driven member 51. For this reason, if the reduction gear unit 52 originally has an elastic member in an output stage thereof, as in the harmonic drive gear, such as Harmonic Drive (a registered trademark), then the elastic member is also included in the torsion bar 53 (spring member).

The joint driven member 51 is one of a pair of members relatively and rotatively connected to each other by the joint having the pair of members. For example, in the joint drive system that drives the joint 22 of the knee joint 15, one of the links of the thigh 14 and the crus 16 is the joint driven member 51, while the housings of the electric motor 50 and the reduction gear unit 52 are secured to the other link.

As described above, according to the present embodiment, the joint drive system is provided with the torsion bar 53 serving as a spring member, permitting flexible motions of each joint.

The present embodiment is provided with a control device 60 composed of an electronic circuit unit, which includes a CPU, a RAM, a ROM and the like, and a variety of sensors to control the motions of the robot 1 having the construction described above.

In this case, as illustrated in FIG. 1, the sensors include a posture sensor 61 mounted on the lower body 10 to measure the angular velocity, the posture angle (the tilt angle relative to the vertical direction and the azimuth about the yaw-axis) and the like of the lower body 10, which is the base body of the robot 1, force sensors 62 (62R and 62L), each of which is interposed between the ankle joint 24 and the foot 18 of each of the leg links 3 to measure an external force (floor reaction force) applied to each of the feet 18 at the time of coming in contact with the ground, and force sensors 63 (63R and 63L), each of which is interposed between the wrist joint 29 and the hand 30 of each of the arm links 4 to measure an external force applied to each of the hands 30 from an object with which the hand 30 comes in contact.

The aforesaid posture sensor 61 is constituted of, for example, a gyro sensor which detects angular velocities about three axes and an acceleration sensor which detects the accelerations in the directions of three axes. Each of the force sensors 62 and 63 is constructed of, for example, six-axis force sensor which detects the translational forces in the directions of the three axes and moments about the three axes, respectively. The acceleration sensor constituting the posture sensor 61 is used also to measure the moving velocity of the lower body 10.

Further, according to the present embodiment, as illustrated in FIG. 2, the joint drive system for each joint is provided with a rotary encoder 64 serving as an angle sensor for detecting the rotational angle of the output shaft 50a of the electric motor 50 (the rotational angle of a rotor) and a differential encoder 65 serving as an angle sensor which detects the rotational angle difference between both ends of the torsion bar 53.

The differential encoder 65 in the present embodiment is a sensor which has a pair of discs 65a and 65b secured to both ends of the torsion bar 53 and outputs a signal based on a relative rotational angle of one of the discs 65a and 65b in relation to the other as a signal based on a rotational angle difference between both ends of the torsion bar 53.

The rotary encoder 64 and the differential encoder 65 are sensors used to measure mainly the rotational angle of the output shaft 50a of the electric motor 50 (or the rotational angle of one end of the torsion bar 53 adjacent to the reduction gear unit 52 (=the rotational angle of the output shaft of the reduction gear unit 52)) and the temporal change rate (rotational angular velocity) thereof, the rotational angle of the joint driven member 51 and the temporal change rate (rotational angular velocity) thereof, and the rotational angle difference between both ends of the torsion bar 53 (=the torsional angle of the torsion bar 53).

In place of the differential encoder 65, an angle sensor, such as a rotary encoder which detects the rotational angle of the joint driven member 51, may be used. Further, in place of the rotary encoder 64, an angle sensor, such as a rotary encoder which detects the rotational angle of the output shaft of the reduction gear unit 52 may be used.

In the following description, the rotational angle of the joint driven member 51 of each joint of the robot 1 may be referred to as the rotational angle of a joint or a joint angle.

The control device 60 receives detection outputs of the aforesaid sensors (or filtering values obtained by passing the detection outputs through appropriate filters). The control device 60 then uses required measurement values (e.g., the measurement value of the posture angle of the lower body 10 and the temporal change rate (angular velocity) thereof, the measurement value of the moving velocity of the lower body 10, the measurement value of an external force acing on each of the feet 18 or the hands 30, and the measurement values of the rotational angle of each joint and the temporal change rate (angular velocity) thereof recognized from the received detection outputs so as to determine the desired value of the driving torque to be imparted to the joint driven member 51 of each joint in order to cause the robot 1 to accomplish a desired motion (hereinafter referred to as the desired joint driving torque). The control device 60 also carries out processing for controlling the output torque of the electric motor 50 of each joint drive system on the basis of the desired joint driving torque.

The following will explain in detail the control processing carried out by the control device 60. In the present embodiment, the control processing in the case where the desired motion of the robot 1 is a motion for traveling on a floor by walking will be taken as an example.

Figure 3:
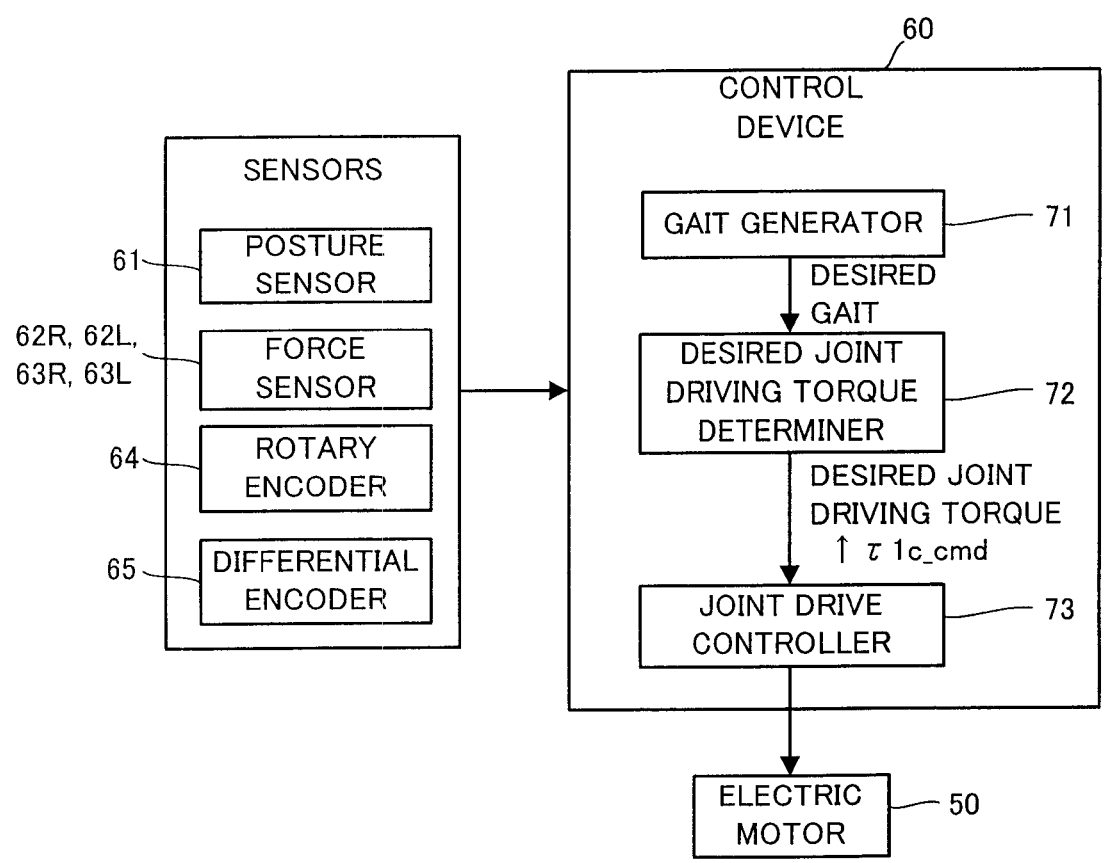
FIG. 3 is a block diagram illustrating major functions of a control device of the mobile robot shown in FIG. 1.

As illustrated in FIG. 3, the control device 60 has a gait generator 71, a desired joint driving torque determiner 72, and a joint drive controller 73 as its major units for implementing functions by running an installed program or the like.

The gait generator 71 is a functional unit that carries out processing for generating a desired gait including at least a desired motion of the robot 1. The desired motion generated by the gait generator 71 includes the time series of a desired joint angle, which indicates a desired value of the displacement amount (rotational angle) of each joint of the robot 1 and the time series of a desired position of the overall center-of-gravity point of the robot 1 (hereinafter referred to as the desired overall center-of-gravity point in some cases).

The aforesaid desired motion is generated by using, for example, the gait generating technique proposed by the applicant of the present application in Japanese Patent Laid-open H5-305579 1 and the like.

The gait generating technique will be schematically explained. The expected landing position, the expected landing posture, and expected landing time aimed by each of both feet 18R and 18L of the robot 1 are determined mainly on the basis of the floor geometry information of an environment in which the robot 1 moves and the requirements on the directions in which the robot 1 travels.

Based on the expected landing position/posture and the expected land time, a foot position/posture trajectory, which is the trajectory (a time series pattern) of a desired position and a desired posture of each of the feet 18, is determined. Further, based on the foot position/posture trajectory, a desired ZMP trajectory, which is the trajectory of a desired position of zero moment point (ZMP) (hereinafter referred to as the desired ZMP in some cases), is determined.

Further, the trajectories of desired positions and desired postures of links (the body link 2 and the like) other than the two leg links 3R and 3L of the robot 1 are determined such that the stability of the robot 1 in the future will be secured while at the same time satisfying a dynamic balance condition that the horizontal component of a moment generated about a desired ZMP by the resultant force of the inertial force generated due to a motion of the entire robot 1 and the gravitational force acting on the robot 1 becomes zero.

Then, based on the desired positions and the desired postures, the desired joint angles of individual joints are determined by using a geometric model (a rigid link model) of the robot 1.

The desired gait may not necessarily be generated in real time while the robot 1 is actually in motion. Alternatively, a desired gait prepared beforehand (off-line) may be input to the control device 60 from outside by means of wireless communication or the like or may be stored and retained beforehand in a storage device (not shown) of the robot 1. In this case, the gait generator 71 is not required.

The desired gait may include a desired value of a particular component (e.g., a vertical component of a translational force) of an overall floor reaction force (total floor reaction force) acting on one or both of feet 18R and 18L or the desired position of the acting point of the total floor reaction force (i.e., the desired ZMP), in addition to a desired motion of the robot 1. In the present embodiment, a desired gait output by the gait generator 71 includes a desired ZMP.

The desired joint driving torque determiner 72 is a functional unit which sequentially carries out processing for determining a desired joint driving torque of each joint for accomplishing the aforesaid desired motion generated by the gait generator 71 for making the actual motion of the robot 1 follow the desired motion). The desired joint driving torque determiner 72 is a functional unit that carries out core processing related to the present invention, which will be discussed in detail later.

The joint drive controller 73 is a functional unit which sequentially carries out processing for controlling the output torque of the electric motor 50 of each joint drive system so as to achieve a desired joint driving torque (specifically, a desired joint driving torque of each joint defined by a corrected desired joint driving torque $\uparrow\tau tc\_cmd$, which will be discussed hereinafter) of each joint sequentially determined by the desired joint driving torque determiner 72 (so as to cause the driving torque actually imparted to the joint driven member 51 of each joint to follow a desired joint driving torque).

The joint drive controller 73 controls the output torque of the electric motor 50, for example, as described below. The joint drive controller 73 sequentially estimates an elastic force torque actually generated by the torsion bar 53 (the driving torque actually imparted from the torsion bar 53 to the joint driven member 51) on the basis of a measurement value of the rotational angle difference between both ends of the torsion bar 53 (the torsional angle of the torsion bar 53). Further, the joint drive controller 73 sequentially sets the desired rotational angular velocity of the output shaft 50a of the electric motor 50 such that the difference between the estimated value of the elastic force torque and the desired joint driving torque is converged to zero.

Subsequently, the joint drive controller 73 determines the desired output torque of the electric motor 50 such that the difference between the desired rotational angular velocity and the measurement value of the rotational angular velocity of the output shaft 50a of the electric motor 50 is converged to zero. Then, the joint drive controller 73 converts the desired output torque into a desired value of energizing current of the electric motor 50, and the actual energizing current is subjected to feedback control based on the desired value, thereby controlling the actual output torque of the electric motor 50 to the desired output torque.

In the control processing by the joint drive controller 73, the output torque of the electric motor 50 may be controlled while compensating for the influences of vibrations of the torsion bar 53 or compensating for the influences of an external force acting on the joint driven member 51.

The processing by the desired joint driving torque determiner 72 will now be explained in detail.

In the following description, a vector (a column of a plurality of components) will be denoted by adding "$\uparrow$" to the beginning of a variable name like, for example, "$\uparrow A$." Unless otherwise specified, a vector will be a longitudinal vector in which components are longitudinally arranged (column vector). In the present description, "*" will be used as a multiplication symbol.

As illustrated in FIG. 4, the desired joint driving torque determiner 72 is provided with, as its major functions, a basic parameter group determiner 81, a contact portion Jacobian matrix determiner 82, a state amount Jacobian matrix determiner 83, a state amount desired value determiner 84, a control input determiner 85, and a compliance controller 86. FIG. 4 illustrates major outputs of the functional units and the destinations to which the major outputs are input.

The desired joint driving torque determiner 72 sequentially carries out the processing by the functional units at a predetermined arithmetic processing cycle thereby to sequentially determine the desired joint driving torque of each joint.

The desired joint driving torque determiner 72 first carries out the processing by the basic parameter group determiner 81, the processing by the contact portion Jacobian matrix determiner 82, the processing by the state amount Jacobian matrix determiner 83, and the processing by the state amount desired value determiner 84.

The basic parameter group determiner 81 is a functional unit which sequentially carries out processing for calculating a parameter of a robot motion model, which is a model representing the relationship (motion equation) between a motion of the robot 1 and a force.

Here, the robot motion model is represented by the following expression 1-1 if an external force (a floor reaction force or the like) acting on the robot 1 from an external world is zero.

$$M*\uparrow q''+\uparrow N+\uparrow G=\uparrow\tau \qquad \text{Expression 1-1}$$

$\uparrow q''$ in this expression 1-1 denotes a second-order differential value of a generalized variable vector $\uparrow q$ of the robot 1 ($=d^2\uparrow q/dt^2$), M denotes an inertia matrix, $\uparrow N$ denotes a centrifugal force/Coriolis force-dependent generalized force vector, $\uparrow G$ denotes a gravity-dependent generalized force vector, and $\uparrow\tau$ denotes a driving force-dependent generalized force vector.

The aforesaid generalized variable vector $\uparrow q$ in the present embodiment is a vector comprised of an array of components, namely, the position and the posture (the position and the posture observed in a global coordinate system) of a single representative link of the robot 1 selected beforehand and the displacement amount (rotational angle) of each joint. The aforesaid representative link in the present embodiment is the lower body 10 serving as the base body of the robot 1. Hereinafter, the lower body 10 will be referred to as the representative link 10 in some cases.

Here, in the description of the present embodiment, more specifically, the term "position" of each link, including the representative link 10 of the robot 1, means the position in the global coordinate system of a representative point fixedly set relative to the link. Similarly, more specifically, the term "posture" of each link means the spatial orientation of the link observed in the global coordinate system (the orientation expressed in terms of the dimension of angle). In the following description, the posture will be referred to as the posture angle in some cases.

The aforesaid global coordinate system is an inertial coordinate system (including a coordinate system that can be approximately regarded as an inertial system), such as a coordinate system secured to a floor (including the ground surface) in an environment in which the robot 1 travels.

Further, each of the position and the posture (posture angle) of each link has three degrees of freedom in the present embodiment, allowing each of them to be expressed by means of three coordinate components. Hence, the number of the components of the generalized variable vector $\uparrow q$, i.e., the degree of freedom of $\uparrow q$, in the present embodiment is the total sum of the total degree of freedom of the position and the posture of the representative link 10 (=6) and the total degree of freedom of all joints of the robot 1. In the robot 1 of the present embodiment illustrated in FIG. 1, the total degree of freedom of all joints is 29. Therefore, the degree of freedom of $\uparrow q$ is 35.

The inertia matrix M is a matrix (symmetric matrix) for converting the second-order differential value $\uparrow q''$ of the generalized variable vector $\uparrow q$ into a generalized force vector, i.e., a matrix in which the component value of a vector obtained by multiplying inertia matrix by $\uparrow q''(=M*\uparrow q'')$ becomes a value having the dimension of a force corresponding to each component of $\uparrow q''$ (a translational force or a moment).

Here, each component of $\uparrow q$ is a position or a posture angle or a rotational angle, so that each component of $\uparrow q''$ has the dimension of a translational acceleration or an angular acceleration. Therefore, each component value of a vector obtained by reversing the sign of $M*\uparrow q''(-M*\uparrow q'')$ means the inertial force generated by a motion of the robot 1. In this case, in the vector $(-M*\uparrow q'')$, the inertial force of a component corresponding to the second-order differential value (translational acceleration) of the position of the representative link 10 is a translational inertial force (an inertial force turning into a translational force). The inertial force of a component corresponding to the second-order differential value (angular acceleration) of the posture of the representative link 10 and the inertial force of the component corresponding to the second-order differential value of the rotational angle (angular acceleration) of each joint are inertial force moments (inertial forces turning into moments).

The inverse matrix $M^{-1}$ of the inertia matrix M is a diagonal matrix.

The generalized force vector is a vector whose components correspond to the components of the generalized variable vector $\uparrow q$ (a vector constituted of the same number of components as that of $\uparrow q$). More specifically, the generalized force vector is a vector, each component of which provides a force (a translational force or a moment) that causes a change (acceleration) in a component value of $\uparrow q$ corresponding thereto. In this case, each component of the generalized force vector is a force of the same type as that of the inertial force based on the second-order differential value of a component of $\uparrow q$ corresponding thereto. The centrifugal force/Coriolis force-dependent generalized force vector $\uparrow N$ is a generalized force vector generated by a centrifugal force and a Coriolis force acting on each link of the robot 1. Further, the gravity-dependent generalized force vector $\uparrow G$ is a generalized force vector generated by a gravitational force acting on each link of the robot 1. In the following description, the sum of $\uparrow N$ and $\uparrow G$ ($=\uparrow N+\uparrow G$) will be referred to as the nonlinear term generalized force vector in some cases.

The driving force-dependent generalized force vector $\uparrow\tau$ is a generalized force vector generated by a driving force of the actuator (the electric motor 50 in the present embodiment) that drives each joint of the robot 1. In the robot 1 according to the present embodiment, the values of the components corresponding to the position and the posture of the representative link 10 in the driving force-dependent generalized force vector $\uparrow\tau$ are always zero. Further, in the $\uparrow\tau$, the value of the component corresponding to the rotational angle of each joint will mean the driving torque to be imparted to the joint (hereinafter referred to as the joint driving torque in some cases).

The parameters calculated by the basic parameter group determiner 81 include the inertia matrix M, the centrifugal force/Coriolis force-dependent generalized force vector $\uparrow N$, and the gravity-dependent generalized force vector $\uparrow G$ (or the nonlinear term generalized force vector ($\uparrow N+\uparrow G$)) in expression 1-1.

Supplementarily, if an external force ($\neq 0$), such as a floor reaction force, acts on the robot 1, then the robot motion model is represented by an expression obtained by adding the term of the generalized force vector depending on the external force (external force term) to expression 1-1 (expression 5-1 to be discussed later). However, the aforesaid M, $\uparrow N$, and $\uparrow G$, which are the parameters calculated by the basic parameter group determiner 81 do not depend on the external force, and the values thereof depend on the motion state of the robot 1, such as the rotational angle and the temporal change rate (angular velocity) thereof of each joint of the robot 1. For this reason, the aforesaid expression 1-1 for describing the basic parameter group determiner 81 omits the external force term.

To calculate the parameters M, $\uparrow N$, and $\uparrow G$ (or M and ($\uparrow N+\uparrow G$)), the basic parameter group determiner 81 sequentially receives the measurement value of the moving velocity of the representative link (the lower body) 10, the measurement value of the posture angle of the representative link 10 and the measurement value of the temporal change rate (angular velocity) thereof, and the measurement value of the rotational angle of each joint and the measurement value of the temporal change rate (angular velocity) thereof. These measurement values are the measurement values recognized by the control device 60 on the basis of the detection outputs of the posture sensor 61, the rotary encoder 64, and the differential encoder 65.

Further, the basic parameter group determiner 81 uses the input measurement values to sequentially calculate the parameters M, ↑N, and ↑G (or M and (↑N+↑G)) according to a publicly known method, such as the Recursive Newton Euler Algorithm (RNEA) or the unit vector method.

Supplementarily, there are some cases where the magnitude of a component value of ↑N becomes sufficiently minute in comparison to the magnitude of the corresponding component value of the gravity-dependent generalized force vector ↑G or becomes zero, leading to ↑N+↑G≈↑G. In such a case, ↑N out of the ↑N and ↑G may be ignored (regarding that the nonlinear term generalized force vector (↑N+↑G) agrees with ↑G), and only ↑G may be calculated.

The aforesaid contact portion Jacobian matrix determiner 82 is a functional unit which carries out processing for sequentially calculating Jacobian matrix (hereinafter referred to as the contact portion Jacobian matrix) that expresses the relationship between the motion speed of a contact portion representative element as an element representing a portion of the robot 1 in contact with the external world (more specifically, one or both of the translational velocity and the rotational velocity (angular velocity) of the contact portion representative element) and the first-order differential value (temporal change rate) of the generalized variable vector ↑q. In other words, the contact portion Jacobian matrix is a matrix that expresses the ratio (sensitivity) of a change in the spatial position/posture (more specifically, one or both of the position and the posture) of the contact portion representative element with respect to a change (minute change) of each component value of the generalized variable vector ↑q.

More specifically, the contact portion representative element serving as the element representing a portion of the robot 1 in contact with the external world means a substantive or virtual element, the motion of which is defined, depending on the state of contact of every contact portion in contact with the external world (the motion state of each contact portion at the time of contact or the state of an external force acting on each contact portion).

Here, a desired motion of the robot 1 described in the present embodiment is a motion for the robot 1 to perform a walking motion, as described above. In this case, the ground contact portion as an actual portion of the robot 1 in contact with the external world (the portion in contact with a floor surface) changes with time. More specifically, the ground contact state of the robot 1 during a walking motion is such that a one-leg ground contact state in which only one of the feet 18R and 18L is a portion in contact with the ground, a two-leg ground contact state in which both feet are portions in contact with the ground, and a one-leg ground contact state in which only the other one is a portion in contact with the ground are repeated in order. Hence, the position/posture of the contact portion representative element should change according to the ground contact states of the feet 18R and 18L.

Thus, the contact portion Jacobian matrix determiner 82 sequentially calculates the contact portion Jacobian matrix while sequentially determining the value of a parameter (the rate value r at, which will be discussed later) that defines the position/posture of the contact portion representative element of the robot 1 according to the ground contact state of the feet 18R and 18L. In this case, the position/posture of the contact portion representative element are determined such that the position/posture will not discontinuously change, i.e., the position/posture will always continuously change, at the time when the ground contact state of the feet 18R and 18L changes or during the periods of the one-leg ground contact state and the two-leg ground contact state, respectively.

To be more specific, in the one-leg ground contact state, the position/posture of the contact portion representative element are set as elements that depend upon the position and the posture of the foot 18R or the foot 18L, whichever is in contact with the ground. In the two-leg ground contact state, the position/posture of the contact portion representative element are set as elements that depend upon the position and the posture of both feet 18R and 18L and how a floor reaction force acts on both feet 18R and 18L.

The following will specifically describe the processing by the contact portion Jacobian matrix determiner 82.

In the present embodiment, the contact portion representative element is regarded as an element formed by connecting a predetermined number of plural points subjected to motional restrictions when one or both of the feet 18R and 18L as the portions to be in contact with the external world come in contact with the ground (or comes in contact with a floor), and the motions (translational motions and rotational motions) of the contact portion representative element are expressed by the motions (translational motions) of the predetermined number of points. Hereinafter, the predetermined number of plural points will be referred to as the contact portion representative points. The number of the contact portion representative points will be maintained to be constant in any one of the ground contact states of the feet 18R and 18L.

Figure 5C:
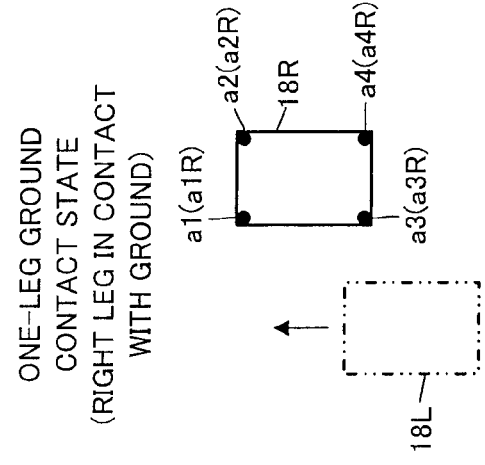
FIG. 5(a) through FIG. 5(c) are diagrams for describing the processing in a first embodiment of a contact portion Jacobian matrix determiner shown in FIG. 4.
Figure 5B:
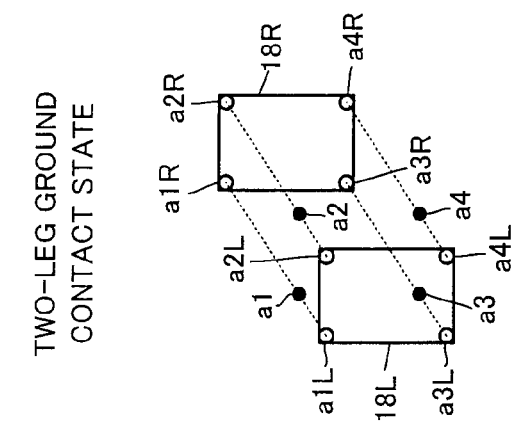
Figure 5A:
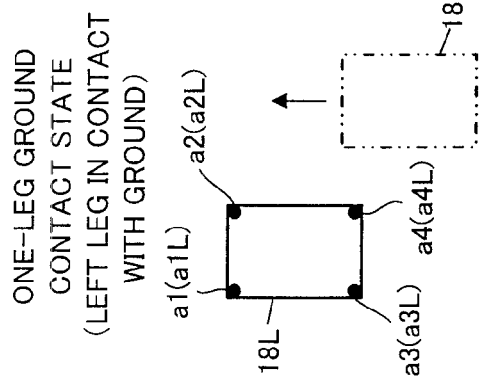

More specifically, the contact portion representative element is constructed of four contact portion representative points a1, a2, a3, and a4 in any one of the ground contact states of the feet 18R and 18L, as illustrated by the black dots in FIGS. 5(a) to 5(c). In FIGS. 5(a) to 5(c), one or both of the feet 18R and 18L in contact with the ground are indicated by solid lines, while the foot off the floor (moving in the air) is indicated by the two-dot chain line.

In this case, the positions of the four contact portion representative points a1 to a4 are specified to the positions based on the ground contact states of the feet 18R and 18L.

To be more specific, in the one-leg ground contact state in which the left foot 18L is in contact with a floor, while the right foot 18R is off the floor (the state wherein the left leg is in contact with the ground), four predetermined points a1L, a2L, a3L, and a4L set beforehand at predetermined positions on the bottom surface of the left foot 18L (the positions secured relative to the left foot 18L) are determined as the contact portion representative points a1, a2, a3, and a4, respectively, as illustrated in FIG. 5(a).

The positions of the four predetermined points a1L to a4L in the present embodiment are the positions of four corners of the bottom surface of the left foot 18L. More specifically, the positions of the predetermined points a1L to a4L are the front left corner of the bottom surface of the left foot 18L, the front right corner thereof, the rear left corner thereof, and the rear right corner thereof, respectively, in order. Hence, the positions of the contact portion representative points a1, a2, a3, and a4 in the state wherein the left leg is in contact with the ground are defined on the basis of the position and the posture of the left foot 18L.

Further, in the one-leg ground contact state in which the right foot 18R is in contact with a floor, while the foot 18L of the left leg link 3L is off the floor (the state wherein the right leg is in contact with the ground), four predetermined points a1R, a2R, a3R, and a4R set beforehand at predetermined positions on the bottom surface of the right foot 18R (the positions secured relative to the right foot 18R) are determined as the contact portion representative points a1, a2, a3, and a4, respectively, as illustrated in FIG. 5(c).

As with the four predetermined points a1L to a4L of the left foot 18L, the positions of the four predetermined points a1R to a4R are the positions of four corners of the bottom surface of the right foot 18R (the positions of the front left corner, the front right corner, the rear left corner, and the rear right corner). Hence, the positions of the contact portion representative points a1, a2, a3, and a4 in the state wherein the right leg is in contact with the ground are defined on the basis of the position and the posture of the right foot 18R.

The mutual positional relationship among the four predetermined points a1R to a4R of the right foot 18R is the same as the mutual positional relationship among the four predetermined points a1L to a4L of the left foot 18L.

In the two-leg ground contact state in which both feet 18R and 18L are in contact with the ground, the positions of the contact portion representative points a1, a2, a3, and a4 are determined to be a position on a line segment connecting the predetermined points a1R and a1L of both feet 18R and 18L, a position on a line segment connecting the predetermined points a2R and a2L, a position on a line segment connecting the predetermined points a3R and a3L, and a position on a line segment connecting the predetermined points a4R and a4L in order, as illustrated in FIG. 5(b).

Here, in the following description, a line segment connecting arbitrary two points A and B will be denoted by line segment A_B, and the length of the line segment A_B (line segment length) will be denoted by L(A_B).

In this case, the positions of the contact portion representative points a1 to a4 in the two-leg ground contact state are more specifically defined as follows.

The positions of the contact portion representative points a1, a2, a3, and a4 are determined such that the ratio of a line segment length $L(a1\_a1L)$ to a line segment length $L(a1R\_a1L)$, i.e., $L(a1\_a1L)/L(a1R\_a1L)$, the ratio of a line segment length $L(a2\_a2L)$ to a line segment length $L(a2R\_a2L)$, i.e., $L(a2\_a2L)/L(a2R\_a2L)$, the ratio of a line segment length $L(a3\_a3L)$ to a line segment length $L(a3R\_a3L)$, i.e., $L(a3\_a3L)/L(a3R\_a3L)$, and the ratio of a line segment length $L(a4\_a4L)$ to a line segment length $L(a4R\_a4L)$, i.e., $L(a4\_a4L)/L(a4R\_a4L)$, present a mutually equal value r at ($0 \leq r$ at $\leq 1$) as indicated by expression 2-1a given below.

In other words, the positions of the contact portion representative points a1, a2, a3, and a4 are determined such that the ratio of a line segment length $L(a1\_a1R)$ to a line segment length $L(a1R\_a1L)$, i.e., $L(a1\_a1R)/L(a1R\_a1L)$, the ratio of a line segment length $L(a2\_a2R)$ to a line segment length $L(a2R\_a2L)$, i.e., $L(a2\_a2R)/L(a2R\_a2L)$, the ratio of a line segment length $L(a3\_a3R)$ to a line segment length $L(a3R\_a3L)$, i.e., $L(a3\_a3R)/L(a3R\_a3L)$, and the ratio of a line segment length $L(a4\_a4R)$ to a line segment length $L(a4R\_a4L)$, i.e., $L(a4\_a4R)/L(a4R\_a4L)$, present a mutually equal ratio value (1−r at) as indicated by expression 2-1b given below.

$$L(a1\_a1L)/L(a1R\_a1L) = L(a2\_a2L)/L(a2R\_a2L) \quad \text{Expression 2-1a}$$
$$= L(a3\_a3L)/L(a3R\_a3L)$$
$$= L(a4\_a4L)/L(a4R\_a4L)$$
$$= r\text{ at}$$

$$L(a1\_a1R)/L(a1R\_a1L) = L(a2\_a2R)/L(a2R\_a2L) \quad \text{Expression 2-1b}$$
$$= L(a3\_a3R)/L(a3R\_a3L)$$
$$= L(a4\_a4R)/L(a4R\_a4L)$$
$$= 1 - r\text{ at}$$

Further, according to the present embodiment, the aforesaid ratio value r at, which defines the positions of the contact portion representative points a1 to a4 in the state wherein both legs are in contact with the ground, is determined on the basis of the ratio of a vertical component Fz_act_R of a translational floor reaction force (a translational force of a floor reaction force) actually acting on the right foot 18R to a vertical component Fz_act_L of a translational floor reaction force actually acting on the left foot 18L. More specifically, the contact portion Jacobian matrix determiner 82 determines the aforesaid ratio value r at according to expression 2-2a or 2-2b given below.

$$r\text{ at}=Fz\_act\_R/(Fz\_act\_R+Fz\_act\_L) \quad \text{Expression 2-2a}$$

$$r\text{ at}=1-Fz\_act\_L/(Fz\_act\_R+Fz\_act\_L) \quad \text{Expression 2-2b}$$

Thus, the positions of the contact portion representative points a1 to a4 in the state wherein both legs are in contact with the ground are determined on the basis of the positions and the postures of both feet 18R and 18L and how a floor reaction force acts on both feet 18R and 18L.

In expression 2-2a or 2-2b, if Fz_act_R is zero, then r at will be zero. In this case, therefore, the contact portion representative points a1, a2, a3, and a4 will coincide with the aforesaid predetermined points a1L, a2L, a3L, and a4L, respectively, of the left foot 18L. In expression 2-2a or 2-2b, if Fz_act_L is zero, then r at will be 1. In this case, therefore, the contact portion representative points a1, a2, a3, and a4 will coincide with the aforesaid predetermined points a1R, a2R, a3R, and a4R, respectively, of the right foot 18R. Further, Fz_act_R will be zero in the state wherein the left leg is in contact with the ground, while Fz_act_L will be zero in the state wherein the right leg is in contact with the ground.

Hence, not only in the state wherein both legs are in contact with the ground but also in the state wherein the left leg is in contact with the ground and in the state wherein the right leg is in contact with the ground, determining the ratio value r at according to expression 2-2a or 2-2b and defining the positions of the contact portion representative points a1, a2, a3, and a4 on the basis of the determined ratio value r at such that the aforesaid expression 2-1a or 2-1b is satisfied will consequently specify the positions of the contact portion representative points a1, a2, a3, and a4 to be the aforesaid positions in the state wherein the left leg is in contact with the ground and the state wherein the right leg is in contact with the ground.

In the present embodiment, therefore, the contact portion Jacobian matrix determiner 82 carries out processing for determining the aforesaid ratio value r at as a parameter defining the positions of the contact portion representative points a1, a2, a3, and a4 (consequently the position and the posture of the contact portion representative element). The following will specifically describe how the processing is carried out.

The measurement values of the actual translational floor reaction force vertical components Fz_act_R and Fz_act_L acting on the feet 18R and 18L are input to the contact portion Jacobian matrix determiner 82 to determine the aforesaid ratio value r at (hereinafter referred to as the contact portion representative element defining ratio r at). The measurement values of Fz_act_R and Fz_act_L are the measurement values recognized by the control device 60 on the basis of mainly the detection outputs of the force sensors 63R and 63L.

Then, based on the received measurement values of the translational floor reaction force vertical components Fz_act_R and Fz_act_L, the contact portion Jacobian matrix determiner 82 calculates the contact portion representative element defining ratio r at according to the aforesaid expression 2-2a or expression 2-2b.

Determining the contact portion representative element defining ratio r at as described above consequently determines the positions of the four contact portion representative points a1 to a4 such that these positions continuously change. In turn, the position and the posture of the contact portion representative element formed by connecting the four contact portion representative points a1 to a4 are determined such that the position and the posture will continuously change.

Supplementarily, according to the present embodiment, the positions of the four contact portion representative points a1 to a4 are determined as described above, so that the foot 18R or 18L itself in contact with the ground corresponds to the contact portion representative element in the state wherein one leg of the robot 1 is in contact with the ground. Meanwhile, in the state wherein both legs of the robot 1 are in contact with the ground, the contact portion representative element corresponds to a virtual element existing between the two feet 18R and 18L.

Further, the contact portion Jacobian matrix determiner 82 determines a contact portion Jacobian matrix by using the contact portion representative element defining ratio r at determined as described above.

In this case, according to the present embodiment, the motion of a contact portion representative element is expressed by the motions of the four contact portion representative points a1 to a4, so that the contact portion Jacobian matrix is indicated by the matrix Jc which represents the relationship between a temporal change rate (a first-order differential value) $\uparrow Xc'$ of a vector $\uparrow Xc$ constructed by an array of the positions of the contact portion representative points a1 to a4 as components (=d$\uparrow$Xc/dt), i.e., the vector $\uparrow Xc'$ constructed using the motion velocities of the individual contact portion representative points a1 to a4 as the components thereof, and a first-order differential value $\uparrow q'$ of the aforesaid generalized variable vector $\uparrow q$ by expression 2-3 given below.

$$\uparrow Xc' = Jc * \uparrow q' \qquad \text{Expression 2-3}$$

The aforesaid vector $\uparrow Xc$ means the position and the posture of a contact portion representative element constructed of the contact portion representative points a1 to a4, and the temporal change rate $\uparrow Xc'$ of $\uparrow Xc$ means the motion velocity of the contact portion representative element. Hereinafter, the $\uparrow Xc$ will be referred to as the contact portion representative element position vector. The motion velocity (translational velocity) of each of the contact portion representative points a1 to a4 has three degrees of freedom, so that $\uparrow Xc'$ is expressed as a vector formed of twelve components (3*4=12).

Here, the contact portion representative element position vector $\uparrow Xc$ in the case where the contact portion representative points a1 to a4 are set to coincide with the aforesaid predetermined points a1R to a4R of the right foot 18R is denoted by $\uparrow Xc\_R$, while the contact portion representative element position vector $\uparrow Xc$ in the case where the contact portion representative points a1 to a4 are set to coincide with the aforesaid predetermined points a1L to a4L of the left foot 18L is denoted by $\uparrow Xc\_L$. Further, the Jacobian matrix that indicates the relationship between a first-order differential value $\uparrow Xc\_R'$ of the $\uparrow Xc\_R$ (=$\uparrow Xc\_R$/dt) and the first-order differential value $\uparrow q'$ of the generalized variable vector $\uparrow q$ is denoted by Jc_R, while the Jacobian matrix that indicates the relationship between a first-order differential value $\uparrow Xc\_L'$ of the $\uparrow Xc\_L$ (=dT$\uparrow Xc\_L$/dt) and the first-order differential value $\uparrow q'$ of the generalized variable vector $\uparrow q$ is denoted by Jc_L. In other words, $\uparrow Xc\_L' = Jc\_L * \uparrow q'$ and $\uparrow Xc\_R' = Jc\_R * \uparrow q'$ apply.

At this time, the contact portion Jacobian matrix Jc is given by the following expression 2-4.

$$Jc = r\,at * Jc\_R + (1-r\,at) * Jc\_L \qquad \text{Expression 2-4}$$

According to the present embodiment, therefore, the contact portion Jacobian matrix determiner 82 calculates the Jacobian matrixes Jc_R and Jc_L of the right side of expression 2-4, and the right side of expression 2-4 is calculated from the calculated values of the Jacobian matrixes Jc_R and Jc_L and the contact portion representative element defining ratio r at calculated as described above, thereby calculating the contact portion Jacobian matrix Jc.

In this case, the contact portion Jacobian matrix determiner 82 receives the moving velocity of the lower body 10, the measurement values of the posture angle and the temporal change rate (angular velocity) of the lower body 10, and the measurement values of the rotational angles and the temporal change rates (angular velocities) of the joints of each of the leg links 3R and 3L in order to calculate the aforesaid Jacobian matrixes Jc_R and Jc_L. Then, the contact portion Jacobian matrix determiner 82 calculates the aforesaid Jacobian matrixes Jc_R and Jc_L from the received measurement values.

Thus, in the processing carried out by the contact portion Jacobian matrix determiner 82, the contact portion representative element defining ratio r at is determined on the basis of the measurement values of the translational floor reaction force vertical components Fz_act_R and Fz_act_L acting on the robot 1 (by extension, on the basis of the ground contact states of both feet 18R and 18L). Further, the Jacobian matrixes Jc_R and Jc_L are calculated on the basis of the measurement values of predetermined components of the generalized variable vector $\uparrow q$ and the first-order differential value $\uparrow q'$ thereof. Then, the contact portion Jacobian matrix Jc is calculated according to the aforesaid expression 2-4 from the calculated values of the contact portion representative element defining ratio r at and the Jacobian matrixes Jc_R and Jc_L.

Supplementarily, if the denominator of the right side of the aforesaid expression 2-2a or 2-2b can be regarded to be maintained substantially constant, then the contact portion representative element defining ratio r at may be determined according to an expression derived by replacing the denominator of the right side of expression 2-2a or 2-2b by the gravitational force acting on the entire robot 1 (=overall mass of the robot 1\*gravitational force acceleration constant).

If the aforesaid desired gait generated and output by the gait generator 71 (or a desired gait supplied to the control device 60 from outside) includes desired values Fz_cmd_R and Fz_cmd_L of the translational floor reaction force vertical components of the feet 18R and 18L, respectively, then the contact portion representative element defining ratio r at may be determined according to an expression derived by replacing Fz_act_R and Fz_act_L of the aforesaid expression 2-2a or 2-2b by Fz_cmd_R and Fz_cmd_L, respectively.

Alternatively, for example, the contact portion representative element defining ratio r at may be determined by combining (adding up) a filtering value obtained by subjecting the value of r at, which has been calculated according an expression obtained by replacing Fz_act_R and Fz_act_L of expression 2-2a or 2-2b by Fz_cmd_R and Fz_cmd_L, respectively, to filtering of a low-pass characteristic and a filtering value obtained by subjecting the value of r at, which has been calculated by the computation of expression 2-2a or 2-2b, to filtering of a low-cut characteristic (a high-pass characteristic).

In other words, a component on a low frequency side of the contact portion representative element defining ratio r at may be determined on the basis of the ratio of the desired values Fz_cmd_R and Fz_cmd_L and a component on a high frequency side of the contact portion representative element defining ratio r at may be determined on the basis of the ratio of the measurement values of Fz_act_R and Fz_act_L, and then these determined components may be combined (added up), thereby determining the contact portion representative element defining ratio r at.

In this case, for the filtering of a low-pass characteristic and the filtering of a low-cut characteristic, filters whose transfer functions are expressed by, for example, $1/(Tc*s+1)$ and $Tc*s/(Tc*s+1)$, respectively (Tc: predetermined time constant) may be used.

In the present embodiment, the four points a1 to a4 have been used as the contact portion representative points to express the motion of a contact portion representative element. Alternatively, however, three, or five or more points may be used as the contact portion representative points.

The aforesaid state amount Jacobian matrix determiner 83 is a functional unit which sequentially carries out processing for calculating a Jacobian matrix expressing the relationship between a state amount predetermined as a desired state amount for controlling the robot 1 to a desired value proper to ensure a stable walking motion (hereinafter referred to as the state amount to be controlled in some cases) and the first-order differential value ↑q' of the generalized variable vector ↑q (the Jacobian matrix will be hereinafter referred to as the state amount Jacobian matrix).

The state amount to be controlled is a state amount whose value changes as the value of any one component of the generalized variable vector ↑q changes. To be more specific, the state amount to be controlled is a state amount whose value (instantaneous value) is obtained by multiplying a certain state amount Jacobian matrix by the first-order differential value ↑q' of the generalized variable vector ↑q.

In the present embodiment, as the state amount to be controlled, a set of a total translational momentum ↑Ptotal and a total angular momentum ↑Ltotal of the robot 1 observed in the global coordinate system (more specifically, a total angular momentum ↑Ltotal about a predetermined reference point in the global coordinate system) is used. The global coordinate system in the present embodiment uses, for example, a coordinate system (a so-called supporting leg coordinate system) having the origin thereof set at a position based on the ground contact position of the foot of a supporting leg out of the feet 18R and 18L of the robot 1 (e.g., a position in a ground contact surface).

More specifically, the total translational momentum ↑Ptotal is a translational momentum resulting from adding up the momentum of the center-of-gravity point of every link of the robot 1 (=the mass of each link*the moving velocity of the center-of-gravity point of the link). In other words, ↑Ptotal denotes the translational momentum of the overall center-of-gravity of the robot 1. The ↑Ptotal in the present embodiment denotes a vector having three degrees of freedom (a vector constituted of components in the directions of three axes, namely, the roll axis, the pitch axis, and the yaw axis).

In the following description, the roll axis means a horizontal axis in the longitudinal direction of the robot 1, the pitch axis means a horizontal axis in the lateral direction of the robot 1, and the yaw axis means an axis in the vertical direction (gravitational direction).

The total angular momentum ↑Ltotal denotes an angular momentum obtained by adding up the angular momentum about the aforesaid reference point attributable to the translational motion of the center-of-gravity point of every link of the robot 1 (=the vector product of the positional vector of the center-of-gravity point of each link relative to the reference point and the translational momentum of the center-of-gravity point) and the angular moment attributable to a rotational motion of every link about the center-of-gravity point (=the inertial moment of each link*the angular velocity about the center-of-gravity point of the link). The total angular momentum ↑Ltotal in the present embodiment is a vector having two degrees of freedom, excluding a component about the yaw axis (i.e., a vector constituted of components about two axes, namely, the roll axis and the pitch axis). The aforesaid reference point is a point preset on the aforesaid global coordinate system (e.g., the origin of the supporting leg coordinate system).

The state amount Jacobian matrix determiner 83 determines the state amount Jacobian matrix corresponding to the aforesaid state amount to be controlled. In this case, the state amount Jacobian matrix is a matrix Js1 which represents the relationship between a vector ↑S1 (=[↑P, ↑L]$^T$; hereinafter referred to as the state amount vector ↑S1) constructed of the total translational momentum ↑Ptotal and the total angular momentum ↑Ltotal arranged as the components thereof, and the first-order differential value ↑q' of the generalized variable vector ↑q according to expression 3-1 given below.

$$\uparrow S1 = Js1 * \uparrow q' \qquad \text{Expression 3-1}$$

In the present embodiment, the total translational momentum ↑Ptotal is a vector having three degrees of freedom and the total angular momentum ↑Ltotal is a vector having two degrees of freedom. Hence, ↑S1 is a vector constituted of 5 components (3+2=5).

To calculate the state amount Jacobian matrix Js1, the state amount Jacobian matrix determiner 83 receives the measurement values of the moving velocity of the representative link (the lower body) 10 and the posture angle and the temporal change rate (angular velocity) thereof, and the measurement values of the rotational angle of each joint and the temporal change rate (angular velocity) thereof. Then, the state amount Jacobian matrix determiner 83 calculates the state amount Jacobian matrix Js1 from the received measurement values.

The state amount desired value determiner 84 is a functional unit which carries out processing for determining a desired value related to the state amount to be controlled.

In the present embodiment, the desired value related to the state amount to be controlled is a desired value ↑S1'_cmd of the temporal change rate (first-order differential value) ↑S1' of the state amount vector ↑S1 (=d↑S1/dt).

In this case, ↑S1' is a vector having the first-order differential value ↑Ptotal' of the total translational momentum ↑Ptotal of the robot 1 (=d↑Ptotal/dt) and the first-order differential value ↑Ltotal' of the total angular momentum ↑Ltotal (=d↑Ltotal/dt) as the components thereof (=[↑Ptotal', ↑Ltotal']$^T$). Hence, the desired value TS1'_cmd of ↑S1' (hereinafter referred to as the state amount desired value vector ↑S1'_cmd) corresponds to the desired value of the total inertial force (excluding a moment component about the yaw axis) generated by a motion of the entire robot 1.

More specifically, the state amount desired value vector ↑S1'_cmd is a vector having the desired value of ↑Ptotal' and the desired value of ↑Ltotal' as the components thereof. Further, the desired value of ↑Ptotal' of ↑S1'_cmd corresponds to the desired value of the total translational inertial force generated by a motion of the entire robot 1 (the desired value of the translational inertial force of the overall center-of-gravity of the robot 1), while the desired value of ↑Ltotal' corresponds to the desired value of the total moment inertial force (excluding the component about the yaw axis) generated by a motion of the entire robot 1.

Further, according to the present embodiment, the state amount desired value determiner 84 determines the aforesaid state amount desired value vector ↑S1'_cmd as described below.

The state amount desired value determiner 84 calculates the desired value ↑Ptotal'_cmd of the temporal change rate ↑Ptotal' of the total translational momentum ↑Ptotal and the desired value ↑Ltotal'_cmd of the temporal change rate ↑Ltotal' of the total angular momentum ↑Ltotal in the state amount desired value vector ↑S1'_cmd by carrying out separate arithmetic processing.

To be more specific, regarding the processing for calculating ↑Ptotal'_cmd, the state amount desired value determiner 84 calculates a difference ↑Δr gc between a desired position ↑r gc_cmd of the overall center-of-gravity point of the robot 1 in the global coordinate system and the measurement value of an actual position ↑r gc_act (=↑r gc_cmd−↑Tr gc_act), and a first-order differential value ↑Δr gc' of the difference ↑Δr gc (=d↑Δr gc/dt).

In this case, the desired position ↑r gc_cmd of the overall center-of-gravity point of the robot 1 is input to the state amount desired value determiner 84 from the aforesaid gait generator 71. The measurement value of the actual position ↑r gc_act of the overall center-of-gravity point is sequentially calculated by the control device 60 according to a publicly know method (e.g., a method using a Kalman filter) primarily from the measurement value of the rotational angle of each joint, and the calculated measurement value is input to the state amount desired value determiner 84.

Incidentally, each of ↑r gc_cmd and ↑r gc_act denotes a vector constituted of positions in the directions of three axes, namely, the direction of the roll axis, the direction of the pitch axis, and the direction of the yaw axis (i.e., a position vector having three degrees of freedom).

Then, the state amount desired value determiner 84 calculates a feedback manipulated variable for converging the aforesaid difference ↑Δr gc to zero according to a predetermined feedback control law and determines the calculated feedback manipulated variable as the desired value ↑Ptotal'_cmd of ↑Ptotal'.

In this case, specifically, the state amount desired value determiner 84 determines ↑Ptotal'_cmd according to a proportional-differential law (PD law) such that the aforesaid difference ↑Δr gc is converged to zero. In other words, the state amount desired value determiner 84 determines ↑Ptotal'_cmd according to the following expression 4-1 from the difference ↑Δr gc and a first-order differential value ↑Δr gc' thereof.

$$↑Ptotal'\_cmd = Kp1 * ↑Δr\ gc + Kv1 * ↑Δr\ gc' \quad \text{Expression 4-1}$$

In expression 4-1, Kp1 and Kv1 denote a proportional gain and a differential gain, respectively, of specified values set beforehand. These gains Kp1 and Kv1 are expressed by diagonal matrixes (third-order diagonal matrixes in the present embodiment).

Regarding the processing for calculating Ltotal'_cmd, the state amount desired value determiner 84 calculates a difference ↑Δrg_xy between the horizontal position of a desired LMP of the robot 1 on the global coordinate system (the position in the roll-axis direction and the position in the pitch-axis direction) and the measurement value of the an actual horizontal position ↑r gc_act_xy of the overall center-of-gravity point of the robot 1 (=the component of the aforesaid ↑r gc_act in the roll-axis direction and the component thereof in the pitch-axis direction). In this case, the horizontal position of the desired ZMP of the robot 1 is input to the state amount desired value determiner 84 from the gait generator 71.

Further, the state amount desired value determiner 84 calculates an inclination angle ↑θpend (an inclination angle about two axes, namely, the roll axis and the pitch axis) relative to the vertical direction of an inverted pendulum in the case where the overall center-of-gravity point of the robot 1 is regarded as the mass point of the inverted pendulum which uses a desired ZMP as its supporting point, and also calculates the first-order differential value ↑θpend' thereof (=d↑θpend/dt) from the aforesaid difference ↑Δr g_xy. More specifically, if the component of ↑θpend about the roll axis and the component thereof about the pitch axis are denoted by θpend_x and θpend_y, respectively, then ηpend_x and θpend_y are calculated from the component ↑Δr g_y of the aforesaid difference ↑Δr g_xy in the pitch-axis direction and the component ↑Δr g_x thereof in the roll-axis direction, respectively, according to expressions 4-2a and 4-2b given below.

$$θpend\_x = \tan^{-1}(Δr\ g\_y/h) ≈ Δr\ g\_y/h \quad \text{Expression 4-2a}$$

$$θpend\_y = \tan^{-1}(Δr\ g\_x/h) ≈ Δr\ g\_x/h \quad \text{Expression 4-2b}$$

Then, the first-order differential values (temporal change rates) of these θpend_x and θpend_y are calculated, thereby calculating each component of ↑θpend_xy'.

In expressions 4-2a and 4-2b, "h" denotes a specified value set beforehand as a mean height of the overall center-of-gravity point of the robot 1.

Subsequently, according to a predetermined feedback control law, the state amount desired value determiner 84 calculates the feedback manipulated variable (control input) for converging the inclination angle ↑θpend (=[θpend_x, θpend_y]$^T$) of the inverted pendulum calculated as described above to zero, and determines the calculated feedback manipulated variable as the desired value ↑Ltotal'_cmd of ↑Ltotal'.

In this case, specifically, the state amount desired value determiner 84 determines ↑Ltotal'_cmd such that the aforesaid inclination angle ↑θpend is converged to zero according to the PD law (proportional-differential law). More specifically, the state amount desired value determiner 84 determines ↑Ltotal'_cmd according to the following expression 4-3 from the inclination angle ↑θpend and the first-order differential value ↑θpend' thereof.

$$↑Ltotal'\_cmd = Kp2 * ↑θpend + Kv2 * ↑θpend' \quad \text{Expression 4-3}$$

In expression 4-3, Kp2 and Kv2 denote a proportional gain and a differential gain, respectively, of specified values set beforehand. These gains Kp2 and Kv2 are expressed by diagonal matrixes (second-order diagonal matrixes in the present embodiment).

Thus, the desired value of ↑Ptotal'_cmd of ↑Ptotal' and the desired value ↑Ltotal'_cmd of ↑Ltotal' are determined by the processing described above, thereby determining the state amount desired value vector ↑S1'_cmd (=[↑Ptotal'_cmd, ↑Ltotal'_cmd]$^T$).

In this case, according to the present embodiment, ↑Ptotal'_cmd of ↑S1'_cmd is determined such that the position of the overall center-of-gravity point ↑r gc_act of the robot 1 converges to the desired position ↑r gc_cmd.

Further, ↑Ltotal'_cmd of ↑S1'_cmd is determined such that, in the case where the actual overall center-of-gravity point of the robot 1 is regarded as the mass point of an inverted pendulum, the inclination angle ↑θpend of the inverted pendulum converges to zero (in other words, such that the actual overall center-of-gravity point of the robot 1 converges to a position above a desired ZMP in the vertical direction).

Supplementarily, θpend_x and θpend_y are approximately proportional to Δr g_y and Δr g_x. Hence, the processing for calculating θpend_x and θpend_y may be omitted, and ↑Ltotal'_cmd_xy may be determined such that Δr g_y and Δr g_x converge to zero according to a feedback control law (e.g., the PD law). For example, ↑Ltotal'_cmd_xy may be calculated according to an expression in which ↑θpend of the right side of expression 4-3 has been replaced by a vector [Δr g_y, Δr g_x]$^T$.

Thus, after the processing by the basic parameter group determiner 81, the contact portion Jacobian matrix determiner 82, the state amount Jacobian matrix determiner 83, and the state amount desired value determiner 84 is carried out, the desired joint driving torque determiner 72 carries out the processing by the control input determiner 85.

The control input determiner 85 is a functional unit which sequentially carries out the processing for determining a desired joint driving torque of each joint of the robot 1 required to achieve a desired value related to a state amount to be controlled (the aforesaid state amount desired value vector ↑S1'_cmd). Hereinafter, a vector formed of desired joint driving torques of joints, which are determined by the control input determiner 85, arranged as the components thereof will be denoted by the desired joint driving torque ↑τ1_cmd.

In the description of the present embodiment, ↑τ1_cmd is a vector of the same order as the aforesaid driving force dependent generalized force vector ↑τ (the same order as the generalized variable vector ↑q). In this case, of the components of ↑τ1_cmd, the components corresponding to the position and the posture of the representative link (the lower body 10) of the robot 1 are both zero.

Here, the basic expression used for the processing by the control input determiner 85 will be described below.

In the case where a portion of the robot 1 in contact with the external world is subjected to an external force, a robot motion model expressing the relationship between a motion of the robot 1 and a force (a motional equation) is represented by the following expression 5-1 derived by adding an equivalent of the influence of the external force to the aforesaid expression 1-1 representing a robot motion model in the case where the external force is zero.

$$M*\uparrow q''+\uparrow N+\uparrow G+Jc^T*\uparrow Fc=\uparrow \tau \quad \text{Expression 5-1}$$

In the expression 5-1, ↑Fc denotes an external force acting on the contact portion representative element caused by an external force acting on the portion of the robot 1 in contact with the external world, that is, the foot 18R and/or the foot 18L in the present embodiment (specifically, a total external force acting on the robot 1 through the intermediary of the foot 18R and/or the foot 18 when the contact portion representative element is expressed as the portion on which the external force acts). Jc$^T$ denotes a transposed matrix of the contact portion Jacobian matrix Jc.

As described below, the aforesaid expression 5-1 can be transformed to expression 5-11, which will be discussed later, by defining the motion of a contact portion of the robot 1 subjected to an external force, i.e., the motion of the aforesaid contact portion representative element (the motion is supposed to match a predetermined motion).

Multiplying both sides of expression 5-1 by a matrix Jc*M$^{-1}$ results in the following expression 5-2.

$$Jc*\uparrow q''+Jc*M^{-1}*(\uparrow N+\uparrow G)+Jc*M^{-1}*Jc^T*\uparrow Fc= Jc*M^{-1}*\uparrow \tau \quad \text{Expression 5-2}$$

Meanwhile, the following expression 5-3 is derived by subjecting both sides of the aforesaid expression 2-3, which indicates the relationship between a first-order differential value ↑Xc' of the contact portion representative element position vector ↑Xc as the motion velocity of the contact portion representative element and the first-order differential value ↑q' of the generalized variable vector ↑q, to first-order differentiation and then by carrying out expression formation.

$$Jc*\uparrow q''=\uparrow Xc'-Jc'*\uparrow q' \quad \text{Expression 5-3}$$

In this expression 5-3, Jc' denotes a first-order differential value of the aforesaid contact portion Jacobian matrix Jc (=dJc/dt) and ↑q" denotes a second-order differential value of ↑q (=d$_2$↑q/dt$^2$).

Further, the following expression 5-4 is derived by substituting expression 5-3 into expression 5-2.

$$\uparrow Xc''-Jc'*\uparrow q'+Jc*M^{-1}*(\uparrow N+\uparrow G)++ Jc*M^{-1}*Jc^T*\uparrow Fc=Jc*M^{-1}*\uparrow \tau \quad \text{Expression 5-4}$$

Here, a weight matrix Wat (diagonal matrix) is used to introduce a matrix Jc# and a matrix Rc defined by the following expressions 5-5 and 5-6, respectively.

$$Jc\#\equiv Wat^T*Jc^T*Rc^T \quad \text{Expression 5-5}$$

$$Rc\equiv((Jc*Wat*Jc^T)^{-1})^T \quad \text{Expression 5-6}$$

The matrix Jc# defined by expression 5-5 means a generalized weighted pseudo inverse matrix of the contact portion Jacobian matrix Jc.

In this case, as the aforesaid weight matrix Wat may use, for example, the inverse matrix M$^{-1}$ of the aforesaid inertia matrix M. If Wat=M$^{-1}$, then (Jc#)$^T$=Rc*Jc*Wat=Rc*Jc*M$^{-1}$. Hence, the following expression 5-7 is derived by multiplying both sides of the aforesaid expression 5-4 by the matrix Rc (provided that Wat=M$^{-1}$).

More specifically, the aforesaid expression 5-1 is transformed to the following expression 5-7 by using matrixes Jc# and Rc defined by the following expressions 5-8 and 5-9, respectively, obtained as Wat=M$^{-1}$ according to expressions 5-5 and 5-6.

$$Rc*\uparrow Xc''-Rc*Jc'*\uparrow q'+(Jc\#)^{T}*(\uparrow N+\uparrow G)+ \uparrow Fc=(Jc\#)^{T}*\uparrow \tau \quad \text{Expression 5-7}$$

where $$Jc\#\equiv (M^{-1})^{T}*Jc^{T}*Rc^{T} \quad \text{Expression 5-8}$$

$$Rc\equiv ((Jc*M^{-1}*Jc^{T})^{-1})^{T} \quad \text{Expression 5-9}$$

M$^{-1}$ denotes a diagonal matrix, so that (M$^{-1}$)$^T$=M$^{-1}$.

Here, a case is assumed where a motion of the contact portion representative element is defined and the second-order differential value ↑Xc" of the contact portion representative element position vector ↑Xc (=d$^2$↑Xc/dt$^2$) is set to coincide with a predetermined desired value ↑C (a case where the motion accelerations of the contact portion representative points a1 to a4 are respectively set to coincide with certain predetermined desired values). In other words, a case is assumed where the motions of the feet 18R and 18L, which are contact portions, are defined such that ↑Xc" equals ↑C.

In this case, the following expression 5-10 is derived from the above expression 5-7.

$$\uparrow Fc = (Jc\#)^T * (\uparrow\tau - \uparrow N - \uparrow G) - Rc^* \uparrow C - Rc^* Jc'^* \uparrow q' \quad \text{Expression 5-10}$$

This expression 5-10 is substituted into the above 5-1, and further, a matrix Tc, a vector ↑Cc, a matrix Pc, and a generalized force vector ↑τcmpn, which are defined by the following expressions 5-12, 5-13, 5-14, and 5-15, respectively, are used thereby to provide the following expression 5-11.

$$M^* \uparrow q'' + Tc^* \uparrow q' = Pc^* (\uparrow\tau - \uparrow\tau cmpn) \quad \text{Expression 5-11}$$

where $$Tc \equiv -Jc^T * Rc * Jc' \quad \text{Expression 5-12}$$

$$\uparrow Cc \equiv -Jc^T * Rc * \uparrow C \quad \text{Expression 5-13}$$

$$Pc \equiv I - Jc^T * (Jc\#)^T \quad \text{Expression 5-14}$$

$$\uparrow\tau cmpn \equiv (\uparrow N + \uparrow G) - Pc^{-1} * \uparrow Cc \quad \text{Expression 5-15}$$

The above expression 5-11 denotes the motion equation of the robot 1, which applies when the motion of a contact portion representative element is specified, in a form excluding an external force ↑Fc.

An arbitrary state amount ↑S having a value that depends on one or more components of the aforesaid generalized variable vector ↑q of the robot 1 is assumed, and it is also assumed that the relationship between the ↑S and the first-order differential value ↑q' of the generalized variable vector ↑q is denoted by the following expression 5-16 by using a certain Jacobian matrix Js.

$$\uparrow S = Js^* \uparrow q' \quad \text{Expression 5-16}$$

This expression 5-16 is a generalized version of the above expression 3-1. Although ↑S in expression 5-16 does not have to be a vector (may be a scalar), it is denoted as a vector for the convenience of consistency with the above expression 3-1 in this description.

Here, the above expression 5-11 is transformed to the following expression 5-20 by using the relational expression of the following expression 5-17 derived from the above expression 5-16.

$$Js^* \uparrow q'' = \uparrow S' - Js'^* \uparrow q' \quad \text{Expression 5-17}$$

$$\uparrow S' + (Js^* M^{-1} * Tc - Js')^* \uparrow q' = (Js^* M^{-1} * Pc)^* (\uparrow\tau - \uparrow\tau cmpn) \quad \text{Expression 5-20}$$

Thus, determining the values of the matrixes Js, M, Tc, Js', and Pc in expression 5-20 and the values of ↑S', ↑q', and ↑τcmpn makes it possible to determine the driving-force-dependent generalized force vector ↑τ (by extension, the joint driving torque of each joint) according to the above expression 5-20.

Here, the matrix of the right side of expression 5-20 (Js*M$^{-1}$*Pc) (hereinafter defined as As≡Js*M$^{-1}$*Pc) is not necessarily a regular matrix (i.e., an inverse matrix As$^{-1}$ of As does not necessarily exist).

Therefore, in the present embodiment, ↑τ is calculated according to expression 5-22 given below by using a matrix Bs determined from the matrix As according to an expression 5-21a or 5-21b given below.

In the case where As (≡Js*M$^{-1}$*Pc) is a regular matrix;

$$Bs = As^{-1} \quad \text{Expression 5-21a}$$

In the case where As (≡Js*M$^{-1}$*Pc) is not a regular matrix;

$$Bs = As^T * (k^* I + As * As^T)^{-1} \quad \text{Expression 5-21b}$$

where k: positive real number determined such that (k*I+ As*As$^T$) becomes a regular matrix $$\uparrow\tau = Bs^* (\uparrow S' + (Js^* M^{-1} * Tc - Js')^* \uparrow q') + \uparrow\tau cmpn \quad \text{Expression 5-22}$$

This expression 5-22 is the basic expression used to calculate the desired joint driving torque ↑τ1_cmd in the present embodiment. In this case, the matrix Bs determined by the above expression 5-21b means a pseudo inverse matrix of the matrix As.

In the following description, for an arbitrary matrix A, "A$^{-1}$" will mean a matrix matching a matrix B determined by the following expression 5-23 (a pseudo inverse matrix) if the matrix A is not a regular matrix. On the other hand, if the matrix A is a regular matrix, then will mean an inverse matrix of A in its original meaning. Further, whether A is a regular matrix or not, A$^{-1}$ will be referred to as the inverse matrix of A for the sake of convenience.

$$B = A^T * (k^* I + A * A^T)^{-1} \quad \text{Expression 5-23}$$

where k: positive real number determined such that (k*I+A*A$^T$) becomes a regular matrix In the above expression 5-22, the matrix Bs denotes the inverse matrix of As (=As$^{-1}$) in the aforesaid meaning.

Supplementarily, both sides of the above expression 5-20 may be multiplied by an appropriate matrix to constitute an expression for calculating ↑τ. For example, the expression for calculating ↑τ may be constituted in the same manner as described above on the basis of an expression obtained by multiplying both sides of expression 5-20 from the left by a matrix Rsc defined by Rsc≡(Js*Pc$^T$*M$^{-1}$*Js$^T$)$^{-1}$)$^T$. In this case, multiplying both sides of expression 5-20 from the left by the matrix Rsc causes both sides of expression 5-20 to be converted to the dimension of a generalized force vector. Further, the expression for calculating ↑τ will be an expression obtained by replacing the matrix Bs of expression 5-22 by a matrix ((Rsc*Js*M$^{-1}$*Pc)$^{-1}$*Rsc).

Based on the above description, the following will specifically describe the processing by the control input determiner 85.

To calculate the desired joint driving torque ↑τ1_cmd, the control input determiner 85 sequentially receives the inertia matrix M, the centrifugal force/Coriolis force-dependent generalized force vector ↑N and the gravity-dependent generalized force vector ↑G (or the nonlinear term generalized force vector (↑N−↑↑G)) determined by the basic parameter group determiner 81, the contact portion Jacobian matrix Jc determined by the contact portion Jacobian matrix determiner 82, the state amount Jacobian matrix Js1 determined by the state amount Jacobian matrix determiner 83, and the state amount desired value vector ↑S1'_cmd determined by the state amount desired value determiner 84. In addition, the control input determiner 85 sequentially receives the measurement values of the temporal change rates (first-order differential values) ↑q' of the generalized variable vector ↑q (the measurement values of the moving velocity of the lower body 10 and the temporal change rate (angular velocity) of the posture angle and the measurement value of the temporal change rate (angular velocity) of the rotational angle of each joint), and also receives a contact portion representative element desired acceleration ↑C, which will be discussed later.

Then, the control input determiner 85 determines the value of each parameter used for calculating the right side of expression 5-22 by using a predetermined input value, and calculates the right side of expression 5-22 by using the determined parameter, thereby calculating the desired joint driving torque ↑τ1_cmd.

More specifically, the control input determiner 85 carries out processing for calculating the matrixes Tc and Pc and the generalized force vector ↑τcmpn necessary to calculate expression 5-22 by using a predetermined input value.

In this case, the control input determiner 85 uses the inertia matrix M, the centrifugal force/Coriolis force-dependent generalized force vector ↑N and the gravity-dependent generalized force vector ↑G (or the nonlinear term generalized force vector (↑N+↑G)) and the contact portion Jacobian matrix Jc, which have been received, to calculate Tc, Pc, and ↑τcmpn according to the definitional equations of the above expressions 5-8, 5-9, 5-12, 5-13, 5-14, and 5-15.

To be more specific, the control input determiner 85 calculates the matrixes Jc# and Rc according to the above definitional equations 5-8 and 5-9 from the received inertia matrix M and the contact portion Jacobian matrix Jc. Further, from these matrixes Jc# and Rc and the received Jc, the control input determiner 85 calculates the matrixes Tc and Pc according to the above definitional equations 5-12 and 5-14. In this case, Jc', i.e., the temporal change rate (a first-order differential value) of Jc, is calculated from the time series of the received Jc.

Further, the control input determiner 85 calculates the vector Cc according to the definitional equation of the above expression 5-13 from the received Jc and the calculated Rc, and the desired value ↑C of the second-order differential value ↑Xc" of the contact portion representative element position vector ↑Xc (the motion accelerations of the contact portion representative points a1 to a4). Hereinafter, the desired value ↑C will be referred to as the contact portion representative element desired acceleration ↑C.

Here, according to the present embodiment, the desired accelerations of the four contact portion representative points a1 to a4, which are the components of the contact portion representative element desired acceleration ↑C, are preset to zero for all the contact portion representative points a1 to a4. In other words, according to the present embodiment, the contact portion representative points a1 to a4, which constitute a contact portion representative element, remaining stationary relative to a floor or moving at a constant velocity is established as a target for the motions of the feet 18R and 18L serving as the contact portions.

Then, the control input determiner 85 calculates the vector ↑Cc according to the definitional equation of the above expression 5-13 by using the contact portion representative element desired acceleration ↑C. In the present embodiment, the contact portion representative element desired acceleration ↑C is a zero vector, so that all components of the vector ↑Cc are zero. Hence, in actuality, the processing for calculating ↑Cc is unnecessary, and the components of ↑Cc may simply be set to zero.

Further, the control input determiner 85 calculates ↑τcmpn according to the definitional equation of the above expression 5-15 from the above ↑Cc, the calculated Pc, and the received ↑N and ↑G.

The processing for calculating Tc, Pc, and ↑τcmpn is carried out as described above.

Supplementarily, in the case where ↑N+↑G≈↑G applies, the ↑τcmpn may be calculated according to an expression derived from the above expression 5-15 without ↑N.

The control input determiner 85 carries out the processing for calculating the matrix Bs used for the calculation of expression 5-22. In the following description, the matrix Bs corresponding to the state amount to be controlled will be denoted by Bs1.

In this case, the control input determiner 85 calculates the matrix Bs1 from the received inertia matrix M and the state amount Jacobian matrix Js1 and the aforesaid calculated value of Pc. More specifically, the inverse matrix As$^{-1}$ of a matrix (Js1*M$^{-1}$*Pc)(≡As) is determined as Bs1. As described above, if As is not a regular matrix, then As$^{-1}$ is a pseudo inverse matrix calculated according to the above expression 5-23.

Subsequently, the control input determiner 85 calculates ↑τ by carrying out the computation of the right side of the above expression 5-22 (more specifically, the computation of an expression derived by replacing Bs, ↑S', Js, Js', and ↑q' of the right side of expression 5-22 by the measurement value ↑q', Bs1, ↑S1'*cmd*, Js1, and Js1' and, respectively) by using the calculated values of Bs1, Tc and ↑τcmpn, the received state amount desired value vector ↑S1'_cmd, state amount Jacobian matrix Js1 and inertia matrix M, and the measurement value of ↑q', and determines the calculated value of ↑τ as the desired joint driving torque ↑τ1_cmd. In this case, Js1'(=the first-order differential value of Js1) is calculated from the time series of the state amount Jacobian matrix Js1.

In the present embodiment, the desired joint driving torque ↑τ1_cmd is determined by the processing carried out by the control input determiner 85 described above on the basis of the calculated values of M, ↑N, ↑G, Jc, and Js1 (or the calculated values of M, ↑G, Jc, and Js1), the state amount desired value vector ↑S1'_cmd, the measurement value of ↑q', and the contact portion representative element desired acceleration ↑C.

In this case, ↑τ1_cmd is determined such that the temporal change rate ↑S1' of the state amount vector ↑S1 coincides with the state amount desired value vector ↑S1'_cmd while setting the motion accelerations of the contact portion representative points a1 to a4 to coincide with the acceleration defined by the contact portion representative element desired acceleration ↑C.

At this time, as described above, ↑Ptotal'_cmd of ↑S1'_cmd is determined such that the position of the overall center-of-gravity point ↑r gc_act of the robot 1 converges to the desired position ↑r gc_cmd, and ↑Ltotal'_cmd of ↑S1'_cmd is determined such that, in the case where the actual overall center-of-gravity point of the robot 1 is regarded as the mass point of an inverted pendulum, the inclination angle ↑θpend of the inverted pendulum converges to zero Hence, ↑τ1_cmd is consequently determined such that the overall center-of-gravity point of the robot 1 can be maintained at a proper position.

After carrying out the processing by the control input determiner 85 as described above, the desired joint driving torque determiner 72 carries out the processing by the compliance controller 86.

The compliance controller 86 is a functional unit which determines the desired value of the total floor reaction force (overall floor reaction force) acting on the robot 1 on the basis of the desired joint driving torque ↑τ1_cmd determined by the control input determiner 85, and then sequentially carries out processing for correcting the desired joint driving torque ↑τ1_cmd to bring the difference between the determined desired value and the measurement value of the actual total floor reaction force close to zero. Hereinafter, the torque obtained by correcting the desired joint driving torque ↑τ1_cmd by the compliance controller 86 will be referred to as the corrected desired joint driving torque ↑τ1c_cmd. In the present embodiment, the corrected desired joint driving torque $\uparrow\tau1c\_cmd$ is used as the final desired joint driving torque for controlling the electric motor 50 (the desired joint driving torque to be input to the joint drive controller 73) at each arithmetic processing cycle of the control device 60.

In order to calculate the corrected desired joint driving torque $\uparrow\tau1c\_cmd$, the compliance controller 86 sequentially receives the centrifugal force/Coriolis force-dependent generalized force vector $\uparrow N$ and the gravity-dependent generalized force vector $\uparrow G$ (or the nonlinear term generalized force vector ($\uparrow N+\uparrow G$)) determined by the basic parameter group determiner 81, the desired joint driving torque $\uparrow\tau1\_cmd$ determined by the control input determiner 85, and the contact portion representative element defining ratio r at determined by the contact portion Jacobian matrix determiner 82 (or the contact portion representative element position vector $\uparrow Xc$ defined thereby).

In addition, the compliance controller 86 sequentially receives the matrixes Rc, Jc' and Jc# calculated by the control input determiner 85, the contact portion representative element desired acceleration $\uparrow C$ (zero vector in the present embodiment), the measurement values of actual floor reaction forces $\uparrow FM\_act\_R$ and $\uparrow FM\_act\_L$ acting on the feet 18R and 18L, respectively, the measurement value of the moving velocity of the representative link 10, the measurement value of the posture angle of the representative link (the lower body) 10 of the robot 1 and the measurement value of the temporal change rate (angular velocity) thereof, and the measurement value of the rotational angle of each joint and the measurement value of the temporal change rate (angular velocity) thereof.

The measurement values of the floor reaction forces $\uparrow FM\_act\_R$ and $\uparrow FM\_act\_L$ are the measurement values recognized by the control device 60 on the basis of the detection outputs of the aforesaid force sensors 63R and 63L.

The compliance controller 86 first calculates the right side of the above expression 5-10 from the received $\uparrow N$, $\uparrow G$ (or $\uparrow N+\uparrow G$), Rc, Jc', Jc#, and $\uparrow\tau1\_cmd$, and the measurement value of the first-order differential value $\uparrow q'$ of the generalized variable vector $\uparrow q$, thereby calculating a contact portion representative element desired acting force $\uparrow Fc\_cmd$ as a vector formed of an array of the desired values of forces (translational forces) acting on the contact portion representative points a1 to a4.

More specifically, $\uparrow Fc\_cmd$ is calculated according to expression 7-1 given below. The contact portion representative element desired acting force $\uparrow Fc\_cmd$ means an estimated value of a force (translational force) to be applied to the robot 1 at the contact portion representative points a1 to a4 in the case where the motion acceleration of the contact portion representative element is set to coincide with the contact portion representative element desired acceleration $\uparrow C$ and the actual joint driving torque of each joint of the robot 1 is set to coincide with the desired joint driving torque defined by $\uparrow\tau1\_cmd$.

$$\uparrow Fc\_cmd=(Jc\#)^{T*}(\uparrow\tau1\_cmd-\uparrow N-\uparrow G)-Rc^{*}\uparrow c-Rc^{*}Jc'^{*}\uparrow q' \quad \text{Expression 7-1}$$

If $\uparrow N+\uparrow G\approx\uparrow G$ applies, then $\uparrow N$ in expression 7-1 may be omitted.

Subsequently, the compliance controller 86 converts the contact portion representative element desired acting force $\uparrow Fc\_cmd$ to a desired total floor reaction force $\uparrow FMt\_cmd$, which is the desired value of a force to be applied to a predetermined overall floor reaction force acting point (e.g., a desired ZMP) serving as the acting point of an overall floor reaction force relative to the robot 1.

In the present embodiment, the desired total floor reaction force $\uparrow FMt\_cmd$ is a vector formed of translational force components in the directions of three axes and moment components about three axes (a vector having six degrees of freedom). In this case, the translational force component of $\uparrow FMt\_cmd$ will be the result of adding up the desired translational forces acting on the individual contact portion representative points a1 to a4. Further, the moment component of $\uparrow FMt\_cmd$ will be the result of adding up the moments generated about the total floor reaction force acting point by the desired translational forces acting on the contact portion representative points a1 to a4.

The conversion of $\uparrow Fc\_cmd$ to $\uparrow FMt\_cmd$ is effected by multiplying a conversion matrix, which has a component determined on the basis of the positional relationship between each of the contact portion representative points a1 to a4 and the aforesaid floor reaction force acting point, by $\uparrow Fc\_cmd$.

Further, the compliance controller 86 calculates the measurement value of the total floor reaction force $\uparrow FMt\_act$ actually acting on the aforesaid overall floor reaction force acting point from the measurement values of the actual floor reaction forces $\uparrow FM\_act\_R$ and $\uparrow FM\_act\_L$ acting on the feet 18R and 18L, respectively.

In this case, according to the present embodiment, the measurement value of $\uparrow FM\_act\_R$ is a vector formed of the translational force components in the directions of three axes and the moment components about three axes, which act on a predetermined floor reaction force acting point corresponding to the right foot 18R. Similarly, the measurement value of $\uparrow FM\_act\_L$ is a vector formed of the translational force components in the directions of three axes and the moment components about three axes, which act on a predetermined floor reaction force acting point corresponding to the left foot 18L.

Further, the compliance controller 86 adds up the result obtained by converting the measurement value of $\uparrow FM\_act\_R$ to a force (a set of a translational force component and a moment component) acting on an overall floor reaction force acting point by using a conversion matrix, which has a component determined on the basis of the positional relationship between the overall floor reaction force acting point and the floor reaction force acting point of the right foot 18R and the result obtained by converting the measurement value of $\uparrow FM\_act\_L$ to a force (a set of a translational force component and a moment component) acting on an overall floor reaction force acting point by using a conversion matrix, which has a component determined on the basis of the positional relationship between the overall floor reaction force acting point and the floor reaction force acting point of the left foot 18L. Thus, the measurement value of the total floor reaction force $\uparrow FMt\_act$ is calculated.

The translational force component of the measurement value of $\uparrow FMt\_act$ provides a translational force of the total sum (vector sum) of the translational force component of $\uparrow FM\_act\_R$ and the translational force component of $\uparrow FM\_act\_L$. Further, the moment component of $\uparrow FMt\_act$ provides a moment of the total sum (vector sum) of the moment generated about the overall floor reaction force acting point by the moment component of $\uparrow FM\_act\_R$, the moment component of $\uparrow FM\_act\_L$ and the translational force component of $\uparrow FM\_act\_R$, and the moment generated about the overall floor reaction force acting point by the translational force component of $\uparrow FM\_act\_L$.

After calculating the measurement values of the desired total floor reaction force $\uparrow FMt\_cmd$ and the total floor reaction force $\uparrow FMt\_act$ as described above, the compliance controller 86 calculates a difference $\uparrow\Delta FMt$ therebetween ($=\uparrow FMt\_cmd-\uparrow FMt\_act$). Then, the compliance controller 86 calculates, according to a predetermined feedback control law, a correction amount ↑Δτt of the desired joint driving torque ↑τ1_cmd serving as the manipulated variable for converging the difference ↑ΔFMt to zero.

To be more specific, according to the present embodiment, the compliance controller 86 converts a vector Gk*↑ΔFMt, which is obtained by multiplying the difference ↑ΔFMt by a proportional gain Gk of a predetermined value, into an error ↑ΔFc relative to the desired value (the contact portion representative element desired acting force ↑Fc_cmd) of an actual force (translational force) acting on the contact portion representative points a1 to a4.

The conversion is effected by multiplying the vector Gk*↑ΔFMt by an inverse matrix of a conversion matrix for converting the aforesaid ↑Fc_cmd into ↑FMt_cmd. In the present embodiment, the conversion matrix for converting ↑Fc_cmd into ↑FMt_cmd is not a regular matrix, so that the inverse matrix of the conversion matrix is a pseudo inverse matrix determined according to the above expression 5-23.

Further, the compliance controller 86 multiplies the error ↑ΔFc by an inverse matrix $(Jc\#^T)^{-1}$ of a matrix $Jc\#^T$, as indicated by the following expression 7-2, thereby calculating a correction amount ↑Δτt of a resultant desired joint driving torque ↑τt_cmd.

$$\uparrow \Delta \tau t = (Jc\#^T)^{-1} * \uparrow \Delta Fc \qquad \text{Expression 7-2}$$

Thus, the correction amount ↑Δτt is determined so as to converge the difference ↑ΔFMt to zero according to a proportional law serving as a feedback control law.

Then, the compliance controller 86 adds the correction amount ↑Δτt to the desired joint driving torque ↑τ1_cmd as indicated by expression 7-3 given below thereby to determine a corrected desired joint driving torque ↑τ1c_cmd.

$$\uparrow \tau 1c\_cmd = \uparrow \tau 1\_cmd + \uparrow \Delta \tau t \qquad \text{Expression 7-3}$$

The processing by the compliance controller 86 described above corrects the desired joint driving torque ↑τ1_cmd so as to bring the difference between the desired total floor reaction force ↑FMt_cmd, which is the total floor reaction force corresponding to the desired joint driving torque ↑τ1_cmd, and the measurement value of an actual total floor reaction force ↑FMt_act close to zero.

According to the present embodiment, the corrected desired joint driving torque ↑τ1c_cmd determined as described above (more specifically, the component of ↑τ1c_cmd corresponding to the rotational angle of each joint) is input to the joint drive controller 73.

This completes the detailed explanation of the processing carried out by the desired joint drive torque determiner 72.

According to the present embodiment described above, the desired value of the first-order differential value ↑Ptotal' of the total translational momentum of the state amount desired value vector ↑S1'_cmd is determined such that the position of the overall center-of-gravity point of the robot 1 including the position in the vertical direction converges to the desired position of the overall center-of-gravity point of a desired gait generated by the gait generator 71. In other words, the desired value of ↑Ptotal' corresponding to the desired value of the translational inertial force generated by a motion of the robot 1 is determined such that the actual position of the overall center-of-gravity point of the robot 1 converges to a proper desired position.

Further, the desired value of the first-order differential value ↑Ltotal' of the total angular momentum in ↑S1'_cmd is determined such that the horizontal position of the overall center-of-gravity point of the robot 1 converges to a position in the vertical direction above a desire ZMP, which serves as the supporting point of a virtual inverted pendulum having its mass point at the overall center-of-gravity point. In other words, the desired value of ↑Ltotal' corresponding to the desired value of a moment inertial force generated by a motion of the robot 1 is determined such that the actual horizontal position of the overall center-of-gravity point of the robot 1 is converged to a position that makes it possible to prevent the aforesaid virtual inverted pendulum from tilting.

Further, in the present embodiment, the desired joint driving torque ↑τ1_cmd is determined so as to allow the desired value of ↑Ptotal' and the desired value of ↑Ltotal' of the state amount desired value vector ↑S1'_cmd to be achieved.

Here, in the robot 1 according to the present embodiment, the joint drive system of each joint is provided with the torsion bar 53, which is a spring member, thus making each joint flexible. This tends to cause the rotational angle of each joint to easily change due to the influence of an external force acting on the robot 1, thus causing the position of the overall center-of-gravity point (especially the position thereof in the vertical direction) to easily change. However, the state amount desired value vector ↑S1'_cmd is determined as described above, so that, if the actual position of the overall center-of-gravity point of the robot 1 deviates from a desired position, then the desired joint driving torque ↑τ1_cmd is determined such that the deviation is corrected.

This arrangement makes it possible to restrain the actual position of the overall center-of-gravity point of the robot 1 from deviating from a proper desired position. As a result, even though the joints of the robot 1 are flexible, it is possible to prevent the posture of the robot 1 from becoming unstable, thus permitting higher stability of the behaviors of the robot 1.

In the present embodiment, the desired joint driving torque ↑τ1_cmd is determined according to the above expression 5-20. Therefore, the motions of the contact portion representative points a1 to a4 of the contact portion representative element are defined by the contact portion representative element desired acceleration ↑C, and then ↑τ1_cmd is determined on the basis of the state amount desired value vector ↑S1'_cmd, which is a desired value related to the state amount to be controlled of the robot 1.

With this arrangement, an appropriate ↑τ1_cmd that allows ↑C and ↑S1'_cmd to be achieved can be determined without identifying the value of an external force acting on the robot 1, which is susceptible to the influence of a disturbance or the like. In this case, the total degree of freedom of ↑C and ↑S1'_cmd is smaller than the total degree of freedom of the entire robot 1 (the degree of freedom of the aforesaid generalized force vector ↑q), so that the joint driving torque ↑τ1_cmd can be determined without the need for identifying the rotational motions of all joints of the robot 1. This makes it possible to enhance the flexibility of the motions of the joints of the robot 1 in response to, for example, a change in an external force acting on the robot 1.

Here, the relationship of correspondence between the embodiment described above and the present invention will be supplementarily described.

In the present embodiment, the basic parameter group determining unit in the present invention is implemented by the aforesaid basic parameter group determiner 81. The measurement values of the moving velocity of the lower body 10, the posture angle and the temporal change rate (angular velocity) thereof, and the measurement values of the rotational angle of each joint and the temporal change rate (angular velocity) thereof correspond to the generalized variable observation information in the present invention.

Further, the contact portion Jacobian matrix calculating unit in the present invention is implemented by the aforesaid contact portion Jacobian matrix determiner 82. In this case, the feet 18R and 18L of the robot 1 correspond to the contact portions in the present invention, and the contact portion representative element in the present invention is set as the element constituted by connecting the aforesaid contact portion representative points a1 to a4. In the present embodiment, the measurement values of the aforesaid translational floor reaction force vertical components Fz_act_R and Fz_act_L are used as the contact state information in the present invention.

The state amount Jacobian matrix calculating unit in the present invention is implemented by the state amount Jacobian matrix determiner 83. The state amount desired value determiner 84 implements the motion state amount desired value determining unit in the present invention. In this case, according to the present embodiment, the state amount vector ↑S constituted of the set of the total translational momentum ↑Ptotal and the total angular momentum ↑Ltotal corresponds to the motion state amount in the present invention. Further, the state amount desired value vector ↑S1'_cmd corresponds to the motion state amount desired value in the present invention.

Further, the desired driving force determining unit in the present invention is implemented by the control input determiner 85. In this case, the desired joint driving torque ↑τ1_cmd corresponds to the desired generalized force vector τcmd in the present invention, and the component of this ↑τ1_cmd that corresponds to the rotational angle of each joint corresponds to the desired driving force in the present invention. Further, the aforesaid contact portion representative element desired acceleration ↑C corresponds to the desired value of the contract portion motion acceleration in the present invention The compliance controller 86 and the joint drive controller 73 implement the actuator control unit in the present invention. The processing carried out by the compliance controller 86 implements the contact portion external force desired value determining unit and the driving force correction amount calculating unit in the present invention. More specifically, the contact portion representative element desired acting force ↑Fc_cmd corresponds to the contact portion external force desired value in the present invention, and the contact portion external force desired value determining unit is implemented by the processing for calculating the ↑Fc_cmd according to the above expression 7-1. Further, the aforesaid correction amount ↑Δτt corresponds to the correction amount of a desired driving force in the present invention and the processing for calculating the correction amount ↑Δτt as described above implements the driving force correction amount calculating unit in the present invention.

Second Embodiment

A second embodiment of the present invention will now be described with reference mainly to FIG. 6.

The present embodiment differs from the first embodiment in the method for setting a contact portion representative element in the processing by a desired joint driving torque determiner 72 of a control device 60. Accordingly, in the processing by a desired joint driving torque determiner 72, the processing by a contact portion Jacobian matrix determiner 82, a control input determiner 85, and a compliance controller 86 is partly different from that of the first embodiment. The rest of the processing by the desired joint driving torque determiner 72 (the processing by a basic parameter group determiner 81, a state amount Jacobian matrix determiner 83, and a state amount desired value determiner 84), and the processing by a gait generator 71 and a joint drive controller 73 is the same as that in the first embodiment.

Therefore, the description of the present embodiment will be focused mainly on the different aspects from the first embodiment, and the same matters as those of the first embodiment will not be described again.

In the first embodiment, the motion of a contact portion representative element is defined by the motions of the four contact portion representative points a1 to a4. For this reason, if the motion of the contact portion representative element is restrained, then a restriction equivalent to twelve degrees of freedom (3*4=12) out of the total degree of freedom of an entire robot 1 (the degree of freedom of the generalized force vector ↑q) will result. The present embodiment sets the contact portion representative element such that the degree of freedom subjected to a restriction when the motion of a contact portion representative element is restrained will be less than that in the first embodiment.

According to the present embodiment, the contact portion representative element is defined as an element subjected to the resultant force of external forces (the resultant force on all contact portions) applied from an external world to each portion of the robot 1 in contact with the external world. Further, the external force acting from the external world to each portion of the robot 1 in contact with the external world (a translational force and a moment) is regarded as an external force acting on a contact portion of the robot 1 as an elastic force attributable to the springy displacements of the position and the posture of the surface of contact between the contact portion and the external world (the displacement caused by the elastic deformation of the contact portion or a portion in the external world). Similarly, the resultant force of external forces acting on a contact portion representative element is regarded as an external force acting on a contact portion representative element as an elastic force attributable to the springy displacements (elastic deformation) of the position and the posture of the surface of contact (virtual or substantive surface of contact) between the contact portion representative element and the external world.

More specifically, according to the present embodiment, when the robot 1 travels on a floor surface, the contact portion representative elements in, for example, a walking motion, are defined as the elements to which the resultant force of floor reaction forces (the total floor reaction force) acting on both feet 18R and 18L are applied.

Hence, in the present embodiment, during a walking motion of the robot 1, if a floor reaction force vector (a vector having a translational force and a moment as its components) applied to an acting point existing in the ground contact surface (the surface of contact with the floor) of the right foot 18R is denoted by ↑FM_R=[↑F_R, ↑M_R]$^T$, a floor reaction force vector (a vector having a translational force and a moment as its components) applied to an acting point existing in the ground contact surface (the surface of contact with the floor) of the left foot 18L is denoted by ↑FM_L=[↑F_L, ↑M_L]$^T$, and the resultant force vector acting on a contact portion representative element (the resultant vector of the floor reaction force vectors [↑F_R, ↑M_R]$^T$ and [↑F_L, ↑M_L]$^T$) is denoted by ↑FMt=[↑Ft, ↑Mt]$^T$, then the relationship between [↑Ft, ↑Mt]$^T$ and [↑F_R, ↑M_R]$^T$ and [↑F_—L, ↑M_L]$^T$ is indicated by the following expression 8-1.

$$\uparrow FMt = A\_R * \uparrow FM\_R + A\_L * \uparrow FM\_L \quad \text{Expression 8-1}$$

$$= \begin{bmatrix} \uparrow F\_R + \uparrow F\_L \\ V\_R * \uparrow F\_R + \uparrow M\_R + V\_L * \uparrow F\_L + \uparrow M\_L \end{bmatrix}$$

where $$\uparrow FMt \equiv \begin{bmatrix} \uparrow Ft \\ \uparrow Mt \end{bmatrix}, \uparrow FM\_R \equiv \begin{bmatrix} \uparrow F\_R \\ \uparrow M\_R \end{bmatrix},$$

$$\uparrow FM\_L \equiv \begin{bmatrix} \uparrow F\_L \\ \uparrow M\_L \end{bmatrix}$$

$$A\_R \equiv \begin{bmatrix} I & 0 \\ V\_R & I \end{bmatrix}, A\_L \equiv \begin{bmatrix} I & 0 \\ V\_L & I \end{bmatrix}$$

Here, $\uparrow Ft$ in expression 8-1 denotes a translational force vector, which is constituted of translational force components in the directions of three axes, of the resultant vector $\uparrow FMt$ acting on a contact portion representative element (hereinafter referred to as the total floor reaction force vector $\uparrow FMt$), $\uparrow Mt$ denotes a moment vector, which is constituted of moment components about three axes, of the total floor reaction force vector $\uparrow FMt$, $\uparrow F\_R$ denotes a translational force vector, which is constituted of translational force components in the directions of three axes, of the floor reaction force vector $\uparrow FM\_R$ acting on the right foot 18R, $\uparrow M\_R$ denotes a moment vector, which is constituted of moment components about three axes, of the floor reaction force vector $\uparrow FM\_R$, $\uparrow F\_L$ denotes a translational force vector, which is constituted of translational force components in the directions of three axes, of the floor reaction force vector $\uparrow FM\_L$ acting on the left foot 18L, and $\uparrow M\_L$ denotes a moment vector, which is constituted of moment components about three axes, of the floor reaction force vector $\uparrow FM\_L$.

Further, the components of the matrixes I and 0 of the matrixes A_R and A_L in expression 8-1 denote a third-order unit matrix and a third-order zero matrix, respectively, the component V_R of the matrix A_R denotes a third-order matrix set such that V_R*$\uparrow F\_R$ coincides with a vector product of the positional vector of the ground contact position of the right foot 18R observed from the ground contact position of a ground contact portion representative element (hereinafter denoted by $\uparrow Vp\_R$) and $\uparrow F\_R$ (=$\uparrow Vp\_R \times \uparrow F\_R$), and the component V_L of the matrix A_L denotes a third-order matrix set such that V_L*$\uparrow F\_R$ coincides with a vector product of the positional vector of the ground contact position of the left foot 18L observed from the position of a ground contact portion representative element (hereinafter denoted by $\uparrow Vp\_L$) and $\uparrow F\_L$ (=$\uparrow Vp\_L \times \uparrow F\_L$).

More specifically, the ground contact position of the ground contact portion representative element is the position of the acting point of the total floor reaction force vector $\uparrow FMt$ relative to the ground contact portion representative element. The ground contact position of the right foot 18R is, to be more specific, the position of the acting point of the floor reaction force vector $\uparrow FM\_R$ relative to the right foot 18R, and the ground contact position of the left foot 18L is, to be more specific, the position of the acting point of the floor reaction force vector $\uparrow FM\_L$ relative to the left foot 18L.

Further, according to the present embodiment, the floor reaction force vectors $\uparrow FM\_R$ and $\uparrow FM\_L$ as the external forces acting on the feet 18 in contact with the floor surface as the portions of the robot 1 in contact with the external world are regarded to act on the feet 18 as an elastic force attributable to the springy displacements of the positions and the postures of the contact surfaces between the feet 18 and the floor (the displacement caused by the elastic deformation of the feet 18 or the floor).

Similarly, the total floor reaction force vector $\uparrow FMt$ as an external force acting on a contact portion representative element in the present embodiment is regarded as an external force acting on the contact portion representative element in the form of an elastic force attributable to the springy displacements of the position and the posture (the displacements caused by the elastic deformation of the contact portion representative element or a floor) of the contact surface (substantive or virtual contact surface) between the contact portion representative element and a floor.

Therefore, if the vector whose component is the springy displacement amount of the position and the posture of the ground contact surface (the surface in contact with the floor) when the right foot 18R comes in contact with the ground (the amount of the translational displacement of the ground contact surface from a reference position and the amount of the angular displacement of the ground contact surface from a reference posture) is denoted by $\uparrow X\_R \equiv [\uparrow Xorg\_R, \uparrow Xxot\_R]^T$, the vector whose component is the springy displacement amount of the position and the posture of the ground contact surface (the surface in contact with the floor) when the left foot 18L comes in contact with the ground (the amount of the translational displacement of the ground contact surface from a reference position and the amount of the angular displacement of the ground contact surface from a reference posture) is denoted by $\uparrow X\_L \equiv [\uparrow Xorg\_L, \uparrow Xrot\_L]^T$, and the vector whose component is the amount of the springy displacement of the position and the posture of the ground contact surface (the surface in contact with the floor) of the contact portion representative element (the amount of the translational displacement of the ground contact surface from a reference position and the amount of the angular displacement of the ground contact surface from a reference posture) is denoted by $\uparrow Xcc \equiv [\uparrow Xcc\_org, \uparrow Xcc\_rot]^T$, then the relationship between $\uparrow FM\_R$ and TX_R, the relationship between $\uparrow FM\_L$ and $\uparrow X\_L$, and the relationship between $\uparrow FMt$ and $\uparrow Xcc$ are indicated by the following expressions 8-2, 8-3, and 8-4, respectively.

$$\uparrow FM\_R \equiv \begin{bmatrix} \uparrow F\_R \\ \uparrow M\_R \end{bmatrix} = \begin{bmatrix} kf\_R & 0 \\ 0 & km\_R \end{bmatrix} * \uparrow X\_R \quad \text{Expression 8-2}$$

where $$\uparrow X\_R \equiv \begin{bmatrix} \uparrow Xorg\_R \\ \uparrow Xrot\_R \end{bmatrix}$$

$$\uparrow FM\_L \equiv \begin{bmatrix} \uparrow F\_L \\ \uparrow M\_L \end{bmatrix} = \begin{bmatrix} kf\_L & 0 \\ 0 & km\_L \end{bmatrix} * \uparrow X\_L \quad \text{Expression 8-3}$$

where $$\uparrow X\_L \equiv \begin{bmatrix} \uparrow Xorg\_L \\ \uparrow Xrot\_L \end{bmatrix}$$

$$\uparrow FMt \equiv \begin{bmatrix} \uparrow Ft \\ \uparrow Mt \end{bmatrix} = \begin{bmatrix} kfcc & 0 \\ 0 & kmcc \end{bmatrix} * \uparrow Xcc \quad \text{Expression 8-4}$$

where $$\uparrow Xcc \equiv \begin{bmatrix} \uparrow Xcc\_org \\ \uparrow Xcc\_rot \end{bmatrix}$$

Here, $\uparrow Xorg\_R$ in expression 8-2 denotes a translational displacement amount vector of the springy displacement amount ↑X_R in the directions of three axes, ↑Xrot_R denotes the angular displacement amount vector about three axes in the springy displacement amount ↑X_R, kf_R denotes a third-order diagonal matrix indicating a spring constant (spring constant related to translational displacement) that expresses the relationship between each component of ↑F_R and each component of ↑Xorg_R by a relationship indicated by ↑F_R=kf_R*↑Xorg_R, and km_R denotes a third-order diagonal matrix indicating a spring constant (spring constant related to rotational angle displacement) that expresses the relationship between each component of ↑M_R and each component of ↑Xrot_R by a relationship indicated by ↑M_R=km_R*↑Xrot_R.

Further, ↑Xorg_L in expression 8-3 denotes a translational displacement amount vector of the springy displacement amount ↑X_L in the directions of three axes, ↑Xrot_L denotes the angular displacement amount vector about three axes in the springy displacement amount ↑X_L, kf_L denotes a third-order diagonal matrix indicating a spring constant (spring constant related to translational displacement) that expresses the relationship between each component of ↑F_L and each component of ↑Xorg_L by a relationship indicated by ↑F_L=kf_L*↑Xorg_L, and km_L denotes a third-order diagonal matrix indicating a spring constant (spring constant related to rotational angle displacement) that expresses the relationship between each component of ↑M_L and each component of ↑Xrot_L by a relationship indicated by ↑M_L=km_L*↑Xrot_L.

Further, ↑Xcc_org in expression 8-4 denotes a translational displacement amount vector of the springy displacement amount ↑Xcc in the directions of three axes, ↑Xcc_rot denotes the angular displacement amount vector about three axes in the springy displacement amount ↑Xcc, kfcc denotes a third-order diagonal matrix indicating a spring constant (spring constant related to translational displacement) that expresses the relationship between each component of ↑Ft and each component of ↑Xcc_org by a relationship indicated by ↑Ft=kfcc*↑Xcc_org, and kmcc denotes a third-order diagonal matrix indicating a spring constant (spring constant related to rotational angle displacement) that expresses the relationship between each component of ↑Mt and each component of ↑Xcc_rot by a relationship indicated by ↑Mt=kmcc*↑Xcc_rot.

Further, according to the present embodiment, the ground contact position (the acting point of ↑FMt) of a contact portion representative element coincides with the ground contact position of the right foot 18R (the acting point of ↑FM_R) in a one-leg ground contact state wherein only the right foot 18R comes in contact with the ground. In a one-leg ground contact state wherein only the left foot 18L comes in contact with the ground, the ground contact position (the acting point of ↑FMt) of a contact portion representative element coincides with the ground contact position of the left foot 18L (the acting point of ↑FM_L). In a two-leg ground contact state wherein both feet 18R and 18L come in contact with the ground, the ground contact position (the acting point of ↑FMt) of a contact portion representative element is at an internally dividing point of a line segment connecting the ground contact positions of the two feet 18R and 18L.

More specifically, referring to FIG. 6, the relationship between a position vector ↑Vp_R of the acting point of the floor reaction force vector ↑FM_R applied to the right foot 18R observed from the acting point of the total floor reaction force vector ↑FMt acting on the contact portion representative element and a position vector ↑Vp_L of the acting point of the floor reaction force vector ↑FM_L applied to the left foot 18L observed from the acting point of ↑FMcc is given by the following expression 8-5 on the basis of the contact portion representative element defining ratio r at described in the first embodiment.

$$r\ at^{*}\uparrow Vp\_R = -(1-r\ at)^{*}\uparrow Vp\_L \qquad \text{Expression 8-5}$$

In other words, the ground contact position of the contact portion representative element (the acting point of ↑FMcc) is a position expressed by |↑Vp_R|:|↑Vp_L|=(1−r at):r at on a line segment connecting the ground contact positions of both feet 18R and 18L in the two-leg ground contact state (refer to FIG. 6).

In the present embodiment, the ground contact position (the acting point of ↑FMt) of a contact portion representative element, the ground contact position (the acting point of ↑FM_R) of the right foot 18R, and the ground contact position (the acting point of ↑FM_L) of the left foot 18L are respectively set to, for example, the positions of points where the horizontal components (components about the horizontal axis) of the floor reaction force moments at the acting point, namely, ↑Mt, ↑M_R, and ↑M_L, are zero, i.e., the ZMP. Setting each acting point in this manner leads to the relationship indicated by expression 8-5.

Further, according to the present embodiment, the springy displacement amount ↑Xcc related to a contact portion representative element (hereinafter referred to as the contact portion representative element springy displacement amount ↑Xcc) coincides with the springy displacement amount ↑X_R related to the right foot 18R in a one-leg ground contact state in which only the right foot 18R is in contact with the ground. Similarly, the contact portion representative element springy displacement amount ↑Xcc coincides with the springy displacement amount ↑X_L related to the left foot 18L in a one-leg state wherein only the left foot 18L is in contact with the ground. In a two-leg state wherein both feet 18R and 18L come in contact with the ground, the contact portion representative element springy displacement amount ↑Xcc will be a weighted mean displacement amount of the springy displacement amounts ↑X_R and ↑X_L related to the two feet 18R and 18L, respectively.

To be more specific, the relationship between the contact portion representative element springy displacement amount ↑Xcc and the springy displacement amounts ↑X_R and ↑X_L related to the feet 18R and 18L, respectively, is indicated by expression 8-6 given below, r at and (1−r at) being the weighted coefficients, as with the relationship between the ground contact position of a contact portion representative element (the acting point of ↑FMt) and the ground contact positions of the feet 18R and 18L (the acting points of ↑FM_R and ↑FM_L).

$$\uparrow Xcc = r\ at^{*}\uparrow X\_R + (1-r\ at)^{*}\uparrow X\_L \qquad \text{Expression 8-6}$$

Further, in the processing by the contact portion Jacobian matrix determiner 82 according to the present embodiment, the contact portion representative element springy displacement amount ↑Xcc corresponds to the position and the posture of the contact portion representative element. A matrix Jc which indicates the relationship between the motion velocity of the contact portion representative element, that is, the temporal change rate (a first-order differential value) ↑Xcc' of ↑Xcc (↑Xcc/dt), and a first-order differential value ↑q' of a generalized variable vector ↑q by expression 8-7 given below is defined as the contact portion Jacobian matrix in the present embodiment.

$$\uparrow Xcc' = Jc^{*}\uparrow q' \qquad \text{Expression 8-7}$$

The contact portion representative element springy displacement amount ↑Xcc is a vector constituted of six components, namely, the components of the translational displacement amounts in the directions of three axes and the components of the angular displacement amounts about three axes. For the sake of convenience, in the description of the present embodiment, the same reference character Jc as that in the first embodiment will be used for the contact portion Jacobian matrix. In the following description of the present embodiment, unless otherwise specified, the contact portion Jacobian matrix Jc will mean the Jacobian matrix that indicates the relationship between ↑Xcc' and ↑q' by expression 8-7.

Based on the above, the method for calculating the contact portion Jacobian matrix Jc in the present embodiment will be described.

First, the following expression 8-8 is derived by applying expressions 8-2, 8-3 and 8-4 to the above expression 8-1.

$$\begin{bmatrix} kfcc * \uparrow Xcc\_org \\ kmcc * \uparrow Xcc\_rot \end{bmatrix} = \quad \text{Expression 8-8}$$

$$A\_R * \begin{bmatrix} kf\_R * \uparrow Xorg\_R \\ km\_R * \uparrow Xrot\_R \end{bmatrix} + A\_L * \begin{bmatrix} kf\_L * \uparrow Xorg\_L \\ km\_L * \uparrow Xrot\_L \end{bmatrix}$$

where $$A\_R \equiv \begin{bmatrix} I & 0 \\ V\_R & I \end{bmatrix}, A\_L \equiv \begin{bmatrix} I & 0 \\ V\_L & I \end{bmatrix}$$

The equation of the first line of this expression 8-8 is denoted by the following expression 8-9.

$$kfcc * \uparrow Xcc\_org = kf\_R * \uparrow Xorg\_R + kf\_L * \uparrow Xorg\_L \quad \text{Expression 8-9}$$

Meanwhile, the following expression 8-10 is derived from the above expression 8-6.

$$\uparrow Xcc\_org = r\,at * \uparrow Xorg\_R + (1 - r\,at) * \uparrow Xorg\_L \quad \text{Expression 8-10}$$

Further, the following expressions 8-11a and 8-11b are derived by comparing the above expressions 8-9 and 8-10.

$$kf\_R = wcc * kfcc \quad \text{Expression 8-11a}$$

$$kf\_L = (1 - wcc) * kfcc \quad \text{Expression 8-11b}$$

The equation of the second line of the above expression 8-8 is represented by the following expression 8-12.

$$kmcc * \uparrow Xcc\_rot = \uparrow Vp\_R \times (kf\_R * \uparrow Xorg\_R) + km\_R * \uparrow Xrot\_R + \uparrow Vp\_L \times (kf\_L * \uparrow Xorg\_L) + km\_L * \uparrow Xrot\_L \quad \text{Expression 8-12}$$

where $$\uparrow Vp\_R \times (kf\_R * \uparrow Xorg\_R) = V\_R * (kf\_R * \uparrow Xorg\_R)$$

$$\uparrow Vp\_L \times (kf\_L * \uparrow Xorg\_L) = V\_L * (kf\_L * \uparrow Xorg\_L)$$

Here, referring to FIG. 6, if the positional vector of the ground contact position of the left foot 18L (the acting point of ↑FM_L) observed from the ground contact position of the right foot 18R (the acting point of ↑FM_R) is denoted by ↑V_RL (=↑Vp_L−↑Vp_R), then the following expressions 8-13a and 8-13b can be obtained from the above expression 8-5.

$$\uparrow Vp\_R = -(1 - r\,at) * \uparrow V\_RL \quad \text{Expression 8-13a}$$

$$\uparrow Vp\_L = r\,at * \uparrow V\_RL \quad \text{Expression 8-13b}$$

Applying the above expressions 8-13a and 8-13b and the above expressions 8-11a and 8-11b to the above expression 8-12 leads to the following expression 8-14.

$$kmcc * \uparrow Xcc\_rot = -wcc * (1 - wcc) * \uparrow V\_RL \times \quad \text{Expression 8-14}$$

$$\uparrow Xorg\_R + km\_R * \uparrow Xrot\_R +$$

$$wcc * (1 - wcc) * \uparrow V\_RL \times$$

$$\uparrow Xorg\_L + km\_L * \uparrow Xrot\_L$$

$$= wcc * (1 - wcc) * \uparrow V\_RL \times$$

$$(\uparrow Xorg\_L - \uparrow Xorg\_R) + km\_R *$$

$$\uparrow Xrot\_R + km\_L * \uparrow Xrot\_L$$

In this case, ↑V_RL and (↑Xorg_L−↑Xorg_R) can be regarded as vectors that are parallel to each other, so that the value of the first term of the right side of expression 8-14 will be zero. Therefore, expression 8-14 can be rewritten to expression 8-15 given below.

$$kmcc * \uparrow Xcc\_rot = km\_R * \uparrow Xrot\_R + km\_L * \uparrow Xrot\_L \quad \text{Expression 8-15}$$

Further, the following expression 8-16 is derived from the above expression 8-6.

$$\uparrow Xcc\_rot = r\,at * \uparrow Xrot\_R + (1 - r\,at) * \uparrow Xrot\_L \quad \text{Expression 8-16}$$

Further, the following expressions 8-17a and 8-17b are obtained by comparing the above expressions 8-15 and 8-16.

$$km\_R = r\,at * kmcc \quad \text{Expression 8-17a}$$

$$km\_L = (1 - r\,at) * kmcc \quad \text{Expression 8-17b}$$

Further, applying the above expressions 8-11a and 8-11b and the above expressions 8-17a and 8-17b to the above expression 8-8 leads to the following expression 8-18.

$$\uparrow Xcc = r\,at * A\_R * \uparrow X\_R + (1 - r\,at) * A\_L * \uparrow X\_L \quad \text{Expression 8-18}$$

Then, the following expression 8-19 is obtained by differentiating both sides of the above expression 8-18.

$$\uparrow Xcc' = r\,at * A\_R * \uparrow X\_R' + (1 - r\,at) * A\_L * \uparrow X\_L' \quad \text{Expression 8-18}$$

where ↑Xcc'=d↑Xcc/dt, ↑X_R'=d↑X_R/dt, ↑X_L'=d↑X_L/dt

Here, the temporal change rates of r at*A_R and (1−r at)*A_L will be sufficiently small, and r at*A_R and (1−r at)*A_L will be maintained substantially constant.

In this case, ↑X_R' is considered to coincide with the temporal change rate of the ground contact position (the acting point of ↑FM_R) of the right foot 18R, while ↑X_L' is considered to agree with the temporal change rate of the ground contact position (the acting point of ↑FM_L) of the left foot 18L.

Hence, if a Jacobian matrix denoting the relationship between the temporal change rate of the ground contact position of the right foot 18R (the acting point of ↑FM_R) and the first-order differential value ↑q' of the generalized variable vector ↑q is denoted by Jcc_R, and a Jacobian matrix denoting the relationship between the temporal change rate of the ground contact position of the left foot 18L (the acting point of ↑FM_L) and the first-order differential value ↑q' of the generalized variable vector ↑q is denoted by Jcc_L, then the following expression 8-20 is obtained from the above expressions 8-7 and 8-19.

$$Jc = r\,at * A\_R * Jcc\_R + (1 - r\,at) * A\_L * Jcc\_L \quad \text{Expression 8-20}$$

According to the present embodiment, therefore, the contact portion Jacobian matrix determiner 82 calculates Jacobian matrixes, namely, Jcc_R and Jcc_L, of the right side of expression 8-20 and matrixes A_R and A_L. Then, the contact portion Jacobian matrix determiner 82 calculates the right side of expression 8-20 from the calculated values of the Jacobian matrixes Jcc_R, Jcc_L and the matrixes A_R, A_L and the contact portion representative element defining ratio r at calculated as described in the first embodiment, thereby calculating the contact portion Jacobian matrix Jc.

The following will describe in more detail the processing by the contact portion Jacobian matrix determiner 82 in the present embodiment.

In order to calculate the contact portion representative element defining ratio r at, the Jacobian matrixes Jcc_R, Jcc_L, and the matrixes A_R, A_L used to calculate the right side of the above expression 8-20, the contact portion Jacobian matrix determiner 82 receives the detection outputs of the force sensors 63R and 63L (the measurement values of floor reaction forces acting on the feet 18R and 18L), the measurement values of the moving velocity of the lower body 10 and the posture angle and the temporal change rate (angular velocity) thereof, and the measurement values of the rotational angles and the temporal change rates (angular velocities) of the joints of leg links 3R and 3L.

Subsequently, the contact portion Jacobian matrix determiner 82 computes the above expression 2-2a or 2-2b in the same manner as that in the first embodiment from the measurement values of the translational floor reaction force vertical components Fz_act_R and Fz_act_L so as to calculate the contact portion representative element defining ratio r at. As described in the first embodiment, the r at may be calculated by using the desired values of the translational floor reaction force vertical components Fz_act_R and Fz_act_L.

The contact portion Jacobian matrix determiner 82 also calculates the positions of the acting points (ZMPs in the present embodiment) of the floor reaction force vectors ↑FM_R and ↑FM_L relative to the feet 18R and 18L, respectively, and the position of the acting point (ZMP in the present embodiment) of a total floor reaction force vector ↑FMt, which is a resultant vector of the floor reaction force vectors, on the basis of the measurement values of the floor reaction forces acting on the individual feet 18R and 18L. Then, based on these calculated values of the positions of the acting points, the matrixes A_R and A_L defined by "where" of the above expression 8-1 are calculated.

If the desired gait generated and output by the aforesaid gait generator 71 (or the desired gait supplied to the control device 60 from an external source) includes the desired values of the floor reaction force vectors ↑FM_R and ↑FM_L of the feet 18R and 18L, respectively, then the desired values may be used in place of the measurement values of ↑FM_R and ↑FM_L to calculate the matrixes A_R and A_L. Alternatively, if the desired gait includes the desired positions of ZMPs related to the floor reaction force vectors ↑FM_R and ↑FM_L, respectively, and the desired position of a ZMP related to the total floor reaction force vector ↑FMt, then these desired positions may be used to calculate the matrixes A_R and A_L.

Further, the contact portion Jacobian matrix determiner 82 calculates Jacobian matrixes Jcc_R and Jcc_L on the basis of the measurement values of the moving velocity of the lower body 10 and the posture angle and the temporal change rate (angular velocity) thereof, the measurement values of the rotational angles and the temporal change rates (angular velocities) of the joints of the leg links 3R and 3L, and the positions (or the desired positions) of the acting points (the ZMPs in the present embodiment) of the floor reaction force vectors ↑FM_R and ↑FM_L calculated as described above.

Then, the contact portion Jacobian matrix determiner 82 uses the contact portion representative element defining ratio r at, the Jacobian matrixes Jcc_R and Jcc_L, and the matrixes A_R and A_L, which have been calculated as described above, to compute the right side of the above expression 8-20, thereby calculating the contact portion Jacobian matrix Jc. Thus, the contact portion Jacobian matrix Jc as the Jacobian matrix indicating the relationship between ↑Xcc' and ↑q' by the above expression 8-7 is calculated.

This completes the detailed explanation of the processing by the contact portion Jacobian matrix determiner 82 in the present embodiment.

The processing by the control input determiner 85 in the present embodiment will now be described.

As with the first embodiment, the control input determiner 85 in the present embodiment sequentially receives the inertia matrix M, the centrifugal force/Coriolis force-dependent generalized force vector ↑N and the gravity-dependent generalized force vector ↑G (or the nonlinear term generalized force vector (↑N+↑G)) determined by the basic parameter group determiner 81, the contact portion Jacobian matrix Jc determined by the contact portion Jacobian matrix determiner 82, the state amount Jacobian matrix Js1 determined by the state amount Jacobian matrix determiner 83, and the state amount desired value vector ↑S1'_cmd determined by the state amount desired value determiner 84. In addition, the control input determiner 85 sequentially receives the measurement values of the temporal change rates (first-order differential values) ↑q' of the generalized variable vector ↑q (the measurement values of the moving velocity of the lower body 10 and the temporal change rate (angular velocity) of the posture angle and the measurement value of the temporal change rate (angular velocity) of the rotational angle of each joint), and also a contact portion representative element desired acceleration ↑C (the desired value ↑C of the motion acceleration of the contact portion representative element).

Then, as with the first embodiment, the control input determiner 85 calculates the right side of expression 5-22 by using the received values thereby to calculate the desired joint driving torque ↑τ1_cmd.

In the present embodiment, however, the contact portion Jacobian matrix Jc required to calculate the matrixes Jc#, Rc, Tc, the vector ↑Cc, and the matrix Pc defined by the above expressions 5-8, 5-9, 5-12, 5-13 and 5-14, respectively, is the Jacobian matrix calculated by the contact portion Jacobian matrix determiner 82 according to the above expression 8-20.

Further, according to the present embodiment, the motion acceleration of a contact portion representative element takes the second-order differential value ↑Xcc" of the contact portion representative element springy displacement amount ↑Xcc (=d2↑Xcc/dt2). Hence, the contact portion representative element desired acceleration ↑C required to calculate the vector ↑Cc defined by expression 5-13 is the desired value of ↑Xcc". In this case, in the present embodiment, the desired value ↑C of ↑Xcc" is preset to a zero vector whose component values are zero (however, a zero vector of six components in the present embodiment), as with the one in the first embodiment.

According to the present embodiment, therefore, maintaining the contact portion representative element springy displacement amount ↑Xcc to be constant is the target related to the motions of the feet 18R and 18L serving as the contact portions.

The processing by the control input determiner 85 in the present embodiment is the same as that in the first embodiment except that the contact portion Jacobian matrix Jc and the desired value ↑C used to compute the right side of the above expression 5-22 are different from those in the first embodiment.

The processing by the compliance controller 86 in the present embodiment will now be described.

As with the first embodiment, the compliance controller 86 in the present embodiment sequentially receives the centrifugal force/Coriolis force-dependent generalized force vector ↑N and the gravity-dependent generalized force vector ↑G (or the nonlinear term generalized force vector (↑N+↑G)) determined by the basic parameter group determiner 81, the desired joint driving torque ↑τ1_cmd determined by the control input determiner 85, and the contact portion representative element defining ratio r at determined by the contact portion Jacobian matrix determiner 82. Further, the compliance controller 86 sequentially receives the matrixes Rc, Jc', and Jc# calculated by the control input determiner 85, the contact portion representative element desired acceleration ↑C (zero vector in the present embodiment), the measurement values of the actual floor reaction forces ↑FM_act_R and ↑FM_act_L acting on the feet 18R and 18L, respectively, the measurement value of the moving velocity of the representative link 10, the measurement value of the posture angle of the representative link (lower body) 10 of the robot 1 and the measurement value of the temporal change rate (first-order differential values) thereof, and the measurement value of the rotational angle of each joint and the measurement value of the temporal change rate (angular velocity) thereof.

Then, as with the first embodiment, the compliance controller 86 calculates a contact portion representative element desired acting force ↑Fc_cmd according to the above expression 7-1. In this case, the contact portion representative element desired acting force ↑Fc_cmd in the present embodiment has a meaning as an estimated value of the external force to be applied to a contact portion representative element, i.e., the estimated value of the total floor reaction force vector ↑FMt in the case where the motion acceleration ↑Xcc' of a contact portion representative element is set to coincide with ↑C and the actual joint driving torque of each joint of the robot 1 is set to coincide with a desired joint driving torque defined by ↑τ1_cmd.

In the present embodiment, therefore, the compliance controller 86 sets the contact portion representative element desired acting force ↑Fc_cmd calculated according to the above 7-1 directly as a desired total floor reaction force ↑FMt_cmd as the desired value of a total floor reaction force.

Further, as with the first embodiment, the compliance controller 86 calculates the measurement value of an actual total floor reaction force ↑FMt_act from the measurement values of the actual floor reaction forces ↑FM_act_R and ↑FM_act_L acting on the feet 18R and 18L, respectively.

Then, the compliance controller 86 calculates a difference ↑ΔFMt between the calculated desired total floor reaction force ↑FMt_cmd and the measurement value of the total floor reaction force ↑FMt_act (=↑FMt_cmd−↑FMt_act), and calculates a correction amount ↑Δτt of the desired joint driving torque ↑τ1_cmd, which serves as the manipulated variable for converging the difference ↑ΔFMt to zero, according to the following expression 7-4 having the same form as that of the above expression 7-2.

$$\uparrow \Delta \tau t = (Jc\#^T)^{-1} * \uparrow \Delta FMt \qquad \text{Expression 7-4}$$

In this case, according to the present embodiment, the total floor reaction force ↑FMt directly acts on a contact portion representative element, so that the correction amount ↑Δτt is calculated by expression 7-4 in which ↑ΔFc of the right side of the above expression 7-2 has been replaced by ↑ΔFMt. Incidentally, Jc# of expression 7-4 is calculated according to the definitional equation of the above expression 5-8 by using the contact portion Jacobian matrix Jc in the present embodiment.

Thus, ↑Δτt is determined by a proportional law serving as a feedback control law such that the difference ↑ΔFMt is converged to zero.

Subsequently, as with the first embodiment, the compliance controller 86 determines a corrected desired joint driving torque ↑τ1c_cmd according to the above expression 7-3.

Thus, the desired joint driving torque ↑τ1_cmd is corrected such that the difference between the desired total floor reaction force ↑FMt_cmd, which is the total floor reaction force corresponding to the desired joint driving torque ↑τ1_cmd, and the measurement value of the actual total floor reaction force ↑FMt_act is brought close to zero.

This completes the description of the processing by the compliance controller 86 in the present embodiment.

The present embodiment is the same as the first embodiment except for the aspects described above. According to the present embodiment, the method for determining the state amount desired value vector ↑S1'_cmd is the same as that of the first embodiment, thus making it possible to restrain the actual position of the overall center-of-gravity point of the robot 1 from deviating from a proper desired position, as with the first embodiment. This in turn makes it possible to restrain the posture of the robot 1 from becoming unstable, thereby enhancing the stability of the behaviors of the robot 1 despite the flexible joints of the robot 1.

Further, according to the present embodiment, the motion acceleration ↑Xcc" of a contact portion representative element is defined by the contact portion representative element desired acceleration ↑C (zero vector in the present embodiment), and then ↑τ1_cmd is determined according to the above expression 5-20 on the basis of the state amount desired value vector ↑S1'_cmd as the desired value related to the state amount to be controlled of the robot 1.

Therefore, as with the first embodiment, a proper ↑τ1_cmd that allows ↑C and ↑S1'_cmd to be realized can be determined without identifying the value of an external force acting on the robot 1. In this case, the total degree of freedom of ↑C and ↑S1'_cmd is smaller than the total degree of freedom of the entire robot 1 (the degree of freedom of the aforesaid generalized force vector ↑q) also in the present embodiment, so that the flexibility of the motions of the joints of the robot 1 to accommodate changes or the like in an external force acting on the robot 1 can be enhanced, as with the first embodiment.

In addition, according to the present embodiment, the degree of freedom of the motion acceleration ↑Xcc" of a contact portion representative element and the contact portion representative element desired acceleration ↑C is smaller than that in the first embodiment (six degrees of freedom in the present embodiment). Hence, the restrictions on the degree of freedom of each joint of the robot 1 when each of the feet 18R and 18L comes in contact with the ground (or a floor) can be reduced from those in the first embodiment. As a result, the flexibility of the motions of the joints of the robot 1 can be further enhanced.

Here, the relationship of correspondence between the present embodiment and the present invention will be supplementarily described.

In the present embodiment, the contact portion representative element springy displacement amount ↑Xcc corresponds to the springy displacement amount Xcc of the position and posture of the contact portion representative element in the present invention.

Further, the right leg link 3R corresponds to the first leg link in the present invention, while the right foot 18R corresponds to the distal end of the first leg link. The springy displacement amount ↑X_R related to the right foot 18R corresponds to the springy displacement amount X1 of the position and posture of the distal end of the first leg link in the present invention.

Further, the left leg link 3L corresponds to the second leg link in the present invention, while the left foot 18L corresponds to the distal end of the second leg link. The springy displacement amount ↑X_L related to the left foot 18L corresponds to the springy displacement amount X2 of the position and posture of the distal end of the second leg link in the present invention.

The above expression 8-18 corresponds to the above expression 02 in the present invention. In this case, matrixes A_R and A_L of the right side of expression 8-18 correspond to the matrixes A1 and A2, respectively, in the present invention.

Further, the above expression 8-20 corresponds to the above expression 03 in the present invention. In this case, Jacobian matrixes Jcc_R and Jcc_L of the right side of expression 8-20 correspond to the Jacobian matrixes J1 and J2, respectively, in the present invention.

The relationship of correspondence between the present embodiment and the present invention is the same as the relationship of correspondence between the first embodiment and the present invention except for the aspects described above.

The following will describe some modifications of the embodiments described above.

In each of the aforesaid embodiments, the robot 1 has been a bipedal walking robot, which is a legged mobile robot. However, the robot in the present invention may be a mobile robot other than a legged mobile robot (e.g., a robot that travels on wheels). Alternatively, the robot in the present invention may be an installed robot, any one of links of which is fixed to a floor or the like.

The present invention can be applied also to a case where the robot 1 runs or travels and performs an operation with the hands 30R and/or 30L at the same time rather than being limited to the case where the robot 1 performs walking.

Further, the state amount vector ↑S as the motion state amount may alternatively be formed only of the vertical component of the total translational momentum ↑P. Further alternatively, a set of the vertical component of ↑P and the total angular momentum ↑L may be used as the motion state amount to be controlled.

Further, in the first embodiment, the contact portion representative element desired acceleration ↑C has been set to zero. Alternatively, however, the target of another type of motion of the contact portion representative points a1 to a4 may be set as ↑C. For example, the motion patterns of the contact portion representative points a1 to a4 may be set to sinusoidal patterns. In addition, in the case where, for example, the robot 1 exists in a system, such as an elevator, wherein acceleration is generated, the acceleration of the system (the acceleration observed from an inertial coordinate system) may be added to the contact portion representative element desired acceleration ↑C.

Similarly, a desired value other than the zero vector may be set as the contact portion representative element desired acceleration ↑C in the aforesaid second embodiment.

Further, the compliance controller 86 may be omitted. More specifically, the desired joint driving torque ↑τ1_cmd determined by the control input determiner 85 may be directly used to control the driving torque of each joint of the robot 1.

What is claimed is:

1. A control device for a mobile robot which has a plurality of links interconnected through joints and actuators for driving the joints and in which a power transmitting system located between each joint and each actuator is provided with a spring member which converts the power generated by the actuator into an elastic force and imparts the elastic force to the joint, the control device comprising:

a motion state amount desired value determining processor which determines a motion state amount desired value, which is a desired value related to a predetermined type of motion state amount of the mobile robot which has a value dependent on the value of a generalized variable vector of the mobile robot, the vector including the following components: the displacement amount of each joint of the mobile robot and the position and the posture of a predetermined representative link of the mobile robot on a global coordinate system;

a desired driving force determining processor which receives the determined motion state amount desired value and determines a desired driving force to be imparted to each joint of the mobile robot by carrying out processing of inverse dynamics calculation, using at least the motion state amount desired value; and an actuator control processor which controls the operation of the actuator on the basis of at least the determined desired driving force, wherein the motion state amount desired value includes at least a desired value of a vertical component of a first-order differential value of a total translational momentum of the mobile robot, and the motion state amount desired value determining processor determines the desired value of the vertical component of the first-order differential value of the translational momentum such that the observed value of the vertical position of an overall center-of-gravity point of the mobile robot is converged to a predetermined desired value according to a feedback control law.

2. The control device for a mobile robot according to claim 1, wherein the motion state amount desired value further includes a desired value of a horizontal component of the first-order differential value of a total translational momentum of the mobile robot, and the motion state amount desired value determining processor further determines the desired value of the horizontal component of the first-order differential value of the translational momentum such that the observed value of the horizontal position of the overall center-of-gravity point of the mobile robot converges to a predetermined desired value according to a feedback control law.

3. The control device for a mobile robot according to claim 1, wherein the motion state amount desired value further includes a desired value of the first-order differential value of an angular momentum about a predetermined reference point of the entire mobile robot, and the motion state amount desired value determining processor further determines the desired value of the first-order differential value of the angular momentum such that the observed value of the horizontal position of the overall center-of-gravity point of the mobile robot converges to a predetermined desired value according to a feedback control law.

4. The control device for a mobile robot according to claim 2,
wherein the motion state amount desired value further includes a desired value of the first-order differential value of an angular momentum about a predetermined reference point of the entire mobile robot, and the motion state amount desired value determining processor further determines the desired value of the first-order differential value of the angular momentum such that the observed value of the horizontal position of the overall center-of-gravity point of the mobile robot converges to a predetermined desired value according to a feedback control law.

5. The control device for a mobile robot according to claim 1, further comprising:
a basic parameter group calculating processor which calculates a basic parameter group constituted of an inertia matrix for converting a second-order differential value of the generalized variable vector into a generalized force vector and a gravity-dependent generalized force vector value, which is the value of a generalized force vector produced by a gravitational force acting on each link of the mobile robot, or a basic parameter group constituted of the inertia matrix, the gravity-dependent generalized force vector, and a centrifugal force/Coriolis force-dependent generalized force vector value, which is the value of a generalized force vector generated by a centrifugal force and a Coriolis force acting on each link of the mobile robot, on the basis of generalized variable observation information, which includes at least the observed value of an actual displacement amount of each joint of the mobile robot;
a contact portion Jacobian matrix calculating processor which receives contact state information indicating the contact state or states of one or more contact portions coming in contact with an external world while the mobile robot is traveling and the generalized variable observation information and calculates a contact portion Jacobian matrix, which is a Jacobian matrix expressing a relationship between the motion velocity of a predetermined contact portion representative element set as an element representing the motion of the one or more contact portions being in contact with the external world and the first-order differential value of the generalized variable vector on the basis of at least the received contact state information and generalized variable observation information; and
a state amount Jacobian matrix calculating processor which receives the generalized variable observation information and calculates a state amount Jacobian matrix, which is a Jacobian matrix expressing a relationship between the motion state amount and the first-order differential value of the generalized variable vector on the basis of at least the received generalized variable observation information,
wherein the desired driving force determining processor receives the basic parameter group, the contact portion Jacobian matrix and the state amount Jacobian matrix, which have been calculated, the desired value of a contact portion representative element motion acceleration, which is the desired value of the motion acceleration of the contact portion representative element, the generalized variable observation information, and the determined motion state amount desired value, uses the received data to calculate a component value corresponding to the displacement amount of each joint in a desired generalized force vector τcmd, which is a target of a generalized force vector that satisfies the relationship denoted by expression 01 given below, and determines the calculated component value as a desired driving force to be imparted to the joint:

$$S'+(Js^*M^{-1}*Tc-Js')*q'=(Js^*M^{-1}*Pc)*(\tau cmd-\tau cmpn) \quad \text{Expression 01}$$

where
q: generalized variable vector
q': observed value of first-order differential value of q (=dq/dt)
S: state amount
S': desired value of first-order differential value of S (=dS/dt)
M: inertia matrix
τcmpn: vector defined by $\tau cmpn \equiv (N+G)-Pc^{-1}*Cc$ or $\tau cmpn \equiv G-Pc^{-1}*Cc$
G: gravity-dependent generalized force vector value
N: centrifugal force/Coriolis force-dependent generalized force vector value
Pc: matrix defined by $Pc \equiv I-Jc^T*(Jc\#)^T$
I: unit matrix
Jc: contact portion Jacobian matrix
Jc#: matrix defined by $Jc\#\equiv(M^{-1})^T*Jc^T*Rc^T$
Rc: matrix defined by $Rc\equiv((Jc*M^{-1}*Jc^T)^{-1})^T$
Cc: vector defined by $Cc\equiv-Jc^T*Rc*C$
C: desired value of contact portion representative element motion acceleration (scalar or vector)
Tc: matrix defined by $Tc\equiv-Jc^T*Rc*Jc'$
Jc': matrix obtained by subjecting Jc to first-order differentiation (=dJc/dt)
Js: state amount Jacobian matrix
Js': matrix obtained by subjecting Js to first-order differentiation (=dJs/dt).

6. The control device for a mobile robot according to claim 5,
wherein the mobile robot is a bipedal mobile robot that travels on a floor surface by carrying out a motion in which the distal portions of two leg links alternately come in contact with the floor surface,
the contact portion representative element is an element, the position and posture of which exhibit springy displacements based on a total floor reaction force, which is the resultant force of floor reaction forces acting on the two leg links, and also an element in which the springy displacement amounts of the position and posture of the contact portion representative element are such that the springy displacement amounts of the position and posture of the distal portion of a first leg link caused by a floor reaction force acting on the first leg link out of the two leg links and the springy displacement amounts of the position and posture of the distal portion of a second leg link caused by a floor reaction force acting on the second leg link out of the two leg links have a relationship indicated by expression 02 given below, and
the contact portion Jacobian matrix calculating processor calculates the contact portion Jacobian matrix Jc by calculating the right side of expression 03 given below:

$$Xcc=r\,at^*A1^*X1+(1-r\,at)^*A2^*X2 \quad \text{Expression 02}$$

$$Jc=r\,at^*A1^*J1+(1-r\,at)^*A2^*J2 \quad \text{Expression 03}$$

where
Xcc: vector, the components of which are the springy displacement amounts of the position and posture of a contact portion representative element
r at: coefficient set according to contact state information such that r at =0 applies in a state wherein only the first leg link is in contact with the ground, r at =1 applies in a state wherein only the second leg link is in contact with the ground, or r at continuously changes in a range defined by $0 \leq r$ at $\leq 1$ in a state wherein both the first leg link and the second leg link are in contact with the ground X1: vector, the components of which are the springy displacement amounts of the position and posture of the distal portion of the first leg link produced according to a floor reaction force acting on the first leg link X2: vector, the components of which are the springy displacement amounts of the position and posture of the distal portion of the second leg link produced according to a floor reaction force acting on the second leg link A1: matrix for converting a first floor reaction force vector constituted of a translational force component and a moment component of a floor reaction force acting on the first leg link into a floor reaction force vector acting on the contact portion representative element A2: matrix for converting a second floor reaction force vector constituted of a translational force component and a moment component of a floor reaction force acting on the second leg link into a floor reaction force vector acting on the contact portion representative element J1: Jacobian matrix expressing the relationship between a first-order differential value X1' of X1 (=dX1/dt) and a first-order differential value q' of a generalized variable vector q by X1'=J1*q'

J2: Jacobian matrix expressing the relationship between a first-order differential value X2' of X2 (=dX2/dt) and a first-order differential value q' of a generalized variable vector q by X2'=J2*q'.

7. The control device for a mobile robot according to claim 5, wherein the actuator control processor comprises a contact portion external force desired value determining processor which determines a contact portion external force desired value as an estimated value of an external force acting on the contact portion by carrying out processing of inverse dynamics calculation, using the desired driving force and the contact portion motion acceleration desired value, which have been determined, in the case where it is assumed that a driving force to be actually imparted to each joint of the mobile robot coincides with the determined desired driving force and the actual motion acceleration of the contact portion representative element coincides with the desired value of the contact portion representative element motion acceleration, and a driving force correction amount calculating processor which determines a correction amount of the desired driving force according to a feedback control law such that a difference between the contact portion external force desired value and an observed value of an external force actually acting on the contact portion is converged to zero, and the operation of the actuator is controlled on the basis of the desired driving force that has been corrected using the correction amount.

8. The control device for a mobile robot according to claim 6, wherein the actuator control processor comprises a contact portion external force desired value determining processor which determines a contact portion external force desired value as an estimated value of an external force acting on the contact portion by carrying out processing of inverse dynamics calculation, using the desired driving force and the contact portion motion acceleration desired value, which have been determined, in the case where it is assumed that a driving force to be actually imparted to each joint of the mobile robot coincides with the determined desired driving force and the actual motion acceleration of the contact portion representative element coincides with the desired value of the contact portion representative element motion acceleration, and a driving force correction amount calculating processor which determines a correction amount of the desired driving force according to a feedback control law such that a difference between the contact portion external force desired value and an observed value of an external force actually acting on the contact portion is converged to zero, and the operation of the actuator is controlled on the basis of the desired driving force that has been corrected using the correction amount.

9. The control device for a mobile robot according to claim 1, wherein the spring member is configured to cause the observed value of the position of the overall center-of-gravity point of the mobile robot in the vertical direction to easily change.

* * * * *